US012348550B2

(12) United States Patent
Kraus et al.

(10) Patent No.: US 12,348,550 B2
(45) Date of Patent: Jul. 1, 2025

(54) PREDICTING AND USING THREAT LEVELS FOR CYBER THREATS USING DATA FROM PUBLIC DATA SOURCES

(71) Applicant: AT&T Intellectual Property II, L.P., Atlanta, GA (US)

(72) Inventors: Samuel Kraus, Colonia, NJ (US); Laurie Kraus, Old Bridge, NJ (US); James Cignarella, Millstone Township, NJ (US); James Brunner, Holmdel, NJ (US); Krissa Van Hoorebeke, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 164 days.

(21) Appl. No.: 17/986,961

(22) Filed: Nov. 15, 2022

(65) Prior Publication Data

US 2024/0163303 A1    May 16, 2024

(51) Int. Cl.
*H04L 9/40* (2022.01)

(52) U.S. Cl.
CPC ................ *H04L 63/1433* (2013.01)

(58) Field of Classification Search
None
See application file for complete search history.

(56) References Cited

U.S. PATENT DOCUMENTS

| 9,531,745 B1 * | 12/2016 | Sharma | G06F 40/205 |
| 2007/0226796 A1 * | 9/2007 | Gilbert | G06F 21/577 726/25 |
| 2014/0283035 A1 * | 9/2014 | Sawhney | H04L 63/1483 726/22 |
| 2017/0171231 A1 * | 6/2017 | Reybok, Jr. | H04L 63/1433 |
| 2017/0230392 A1 * | 8/2017 | Dean | G06F 21/552 |
| 2018/0034842 A1 * | 2/2018 | Smyth | G06F 21/577 |

(Continued)

FOREIGN PATENT DOCUMENTS

WO    WO-2018163162 A1 *   9/2018   ........... G06F 16/951

OTHER PUBLICATIONS

Sapienza et al. "Early Warnings of Cyber Threats in Online Discussions," published Jan. 29, 2018 (Year: 2018).*

(Continued)

*Primary Examiner* — Scott B Christensen
(74) *Attorney, Agent, or Firm* — Hartman & Citrin LLC

(57) ABSTRACT

Predicting and using threat levels for cyber threats using data from public data sources can include obtaining cyber vulnerability and threat data ("threat data") from publicly available data sources including a social networking service, the threat data including social networking messages. A threat that is predicted to exploit a vulnerability can be determined based on the threat data. Filtered threat data that includes social networking messages that mention the threat can be stored. A threat assessment service can analyze the filtered threat data to determine a mention trend for the threat, a severity score for the threat, an exploitation history for the threat, and a patch availability for rectifying the threat. Based on the mention trend, the severity score, the exploitation history, and the patch availability, a predicted threat level for the threat can be used to generate an alert, which can be sent to a subscriber device.

20 Claims, 7 Drawing Sheets

(56) References Cited

U.S. PATENT DOCUMENTS

| | | | |
|---|---|---|---|
| 2018/0324196 A1* | 11/2018 | Rao | H04L 67/02 |
| 2018/0351987 A1* | 12/2018 | Patel | G06F 21/577 |
| 2018/0375886 A1* | 12/2018 | Kirti | H04L 67/10 |
| 2019/0036958 A1* | 1/2019 | Shi | H04L 63/1466 |
| 2020/0067965 A1* | 2/2020 | Dada | H04L 63/1433 |
| 2020/0153863 A1* | 5/2020 | Wiener | H04L 63/0421 |
| 2020/0241769 A1* | 7/2020 | Dain | G06F 3/0623 |

OTHER PUBLICATIONS

"Severity Level Description", posted at < https://www.hkcert.org/service/security-bulletin/severity-level> (Year: 2021).*

* cited by examiner

US 12,348,550 B2

PREDICTING AND USING THREAT LEVELS FOR CYBER THREATS USING DATA FROM PUBLIC DATA SOURCES

BACKGROUND

With the proliferation of networking and connectivity has come an exponentially increasing incidence of cyber threats. The ever-increasing number of cyber threats creates several challenges for network operators and/or other entities. One challenge results from the fact that there generally are limited resources available for addressing software vulnerabilities, hardware vulnerabilities, and/or other forms of cyber vulnerabilities and exposures.

The scarcity of resources may be addressed by increasing the number of resources available for addressing cyber threats or by identifying the most serious (e.g., the most likely to be exploited) of the many threats posed at a particular time. Approaches for identifying the most serious of the threats can include using machine learning and/or artificial intelligence to try to predict the seriousness of a threat based on historical data. Such approaches, unfortunately, are often worthless until the threat has existed for some time and/or may not reliably predict seriousness for a host of reasons.

As such, approaches for allocating scarce resources to address only the most serious cyber threats fail to provide a timely decision on threats and therefore result in addressing threats after they have propagated through a network in many cases. Thus, scarce resources reserved for addressing cyber threats may be dedicated unnecessarily to relatively minor vulnerabilities in a network while comparatively serious vulnerabilities are unaddressed by the network.

SUMMARY

The present disclosure is directed to predicting and using threat levels for cyber threats using data from public data sources. As is generally understood in the art of cybersecurity, the term "vulnerability" can be used to refer to a weakness in hardware, software, and/or procedures that can be exploited by an entity such as a malicious actor or entity; the term "threat" can be used to refer to a mechanism by which a vulnerability is exploited to damage or destroy an asset; and the term "risk" can be used to refer to a potential for an asset to be lost, damaged, or destroyed by a threat exploiting a vulnerability. Thus, as used in this description and in the claims, the word "threat" and variants thereof can be used to refer to a vulnerability and/or a threat (e.g., a vulnerability and/or a mechanism that exploits that vulnerability) not withstanding other definitions as used herein and/or in the art. As such, it can be appreciated that in the specification and in the claims the word "threat" may be used to refer in cases in which the terms "vulnerability" and/or "threat" may apply.

A server computer can execute a threat assessment service. The threat assessment service can be configured to obtain threat data from one or more data sources. The threat data can be obtained from one or more data sources that can be publicly accessible (e.g., not proprietary data sources) including open source intelligence sources such as, for example, one or more devices or resources associated with the National Vulnerability Database ("NVD"), one or more devices or resources associated with a social networking service (e.g., the TWITTER social networking service, or the like), one or more devices or resources associated with the Zero Day Initiative ("ZDI"), one or more devices or resources associated with the Exploit Database ("EDB"), e.g., the website located at www.exploit-db.com, and/or other data sources. Thus, the threat data can include, but is not limited to, common vulnerabilities and exposures ("CVE") data, mention trend data, predicted or observed severity data (hereinafter "severity data"), predicted or observed exploitation history data (hereinafter "exploitation history data"), patch availability data, and other data. According to various embodiments of the concepts and technologies disclosed herein, the data sources can include publicly accessible resources, and therefore can also be referred to as open source intelligence ("OSINT") sources.

The common vulnerabilities and exposures data can include information that identifies and/or describes one or more cyber threats such as a software vulnerability or the like, which can be released by one of the data sources such as the national vulnerability database and/or accessed at the data source via an application programming interface ("API") or other functionality. The mention trend data can include information that identifies and/or describes one or more mention trends associated with one or more cyber threats exploiting a software vulnerability or the like, and can be obtained by querying or searching a social networking service (e.g., the TWITTER social networking service) for messages or posts that relate to a particular vulnerability (e.g., a vulnerability identified in the common vulnerabilities and exposures data or the like). The mention trend data can be obtained, in some embodiments, from the data sources as an indication as to how many times and at what rate a particular vulnerability has been mentioned, or the like. In some other embodiments, one of the data sources may provide copies of all messages relating to the identified vulnerability and the threat assessment service can be configured to generate the mention trend data (e.g., by analyzing the time and date information included in the messages to identify the frequency and/or trends associated with the messages).

The severity data can include information that can identify and/or describe one or more predicted or observed severities associated with one or more cyber threats exploiting a software vulnerability or the like. The severity data can be obtained by querying or searching a social networking service (e.g., the TWITTER social networking service) for messages or posts that relate to a particular vulnerability (e.g., a vulnerability identified in the common vulnerabilities and exposures data, certain exploitations, or the like), by analyzing the common vulnerabilities and exposures data (which may define a common vulnerability scoring system ("CVSS") score that can indicate the severity and/or that may include other information that may describe how the threat exploits particular vulnerabilities or the like), or the like, and determining or predicting, based on these and/or other types of information, a severity associated with the cyber threats. The severity data can indicate, for a particular threat, how serious the threat is and/or how serious the threat is predicted or expected to be and/or the seriousness of damage to one or more assets that can be predicted or expected to be caused by the identified threat. The severity data can be obtained from the data sources in some instances, or one of the data sources may provide copies of all messages or posts relating to the identified vulnerability and the threat assessment service can be configured to generate the severity data based on analysis of the messages to predict the severity of the threat.

The exploitation history data can include information that can identify and/or describe one or more exploitations or exploitation histories associated with one or more cyber threats exploiting a software vulnerability or the like, either observed or predicted. The exploitation history data can be obtained by querying or searching a social networking service (e.g., the TWITTER social networking service) for messages or posts that relate to a particular vulnerability (e.g., a vulnerability identified in the common vulnerabilities and exposures data or the like), by analyzing the common vulnerabilities and exposures data (which may describe exploitations by the threat), or the like. The exploitation history data can be obtained from the data sources in some instances, or one of the data sources may provide copies of all messages relating to the identified vulnerability and the threat assessment service can be configured to generate the exploitation history data based on an analysis of the messages for indications associated with exploitations by the threat, predicted exploitations associated with the threat, and/or the like.

The patch availability data can include information that can identify and/or describe one or more patches and/or patch availabilities associated with one or more cyber threats exploiting a software vulnerability or the like. In some embodiments of the concepts and technologies disclosed herein, the patch availability data can be obtained by querying or searching a social networking service (e.g., the TWITTER social networking service) for messages or posts that relate to a particular vulnerability (e.g., a vulnerability identified in the common vulnerabilities and exposures data or the like), by accessing virus software definition updates, by analyzing the common vulnerabilities and exposures data (which may describe patches available to address the vulnerability), or the like. The patch availability data can be obtained from the data sources or one of the data sources may provide copies of all messages relating to the identified vulnerability and the threat assessment service can be configured to generate the patch availability data based on an analysis of the messages for indications associated with patches for the vulnerability. The other data can include, but is not limited to, other information relating to threats such as a first detection date, a number of detections or exploitations associated with the threat, historical trends associated with the threat (e.g., numbers and/or frequencies of detections or exploitations over time), data that describes vulnerable systems or devices, and/or other information associated with the threats. Thus, it should be understood that according to various embodiments of the concepts and technologies disclosed herein, the threat data and/or components thereof can be released by one of the data sources, accessed at the data source via an API, parsed from data stored by the data source, and/or generated by the threat assessment service based on analysis of other data from the data sources. Because the threat data can be obtained in additional and/or alternative manners, it should be understood that these examples are illustrative, and therefore should not be construed as being limiting in any way.

The threat assessment service can obtain the threat data and store the threat data locally. The threat assessment service can analyze the threat data to identify threats represented by the threat data, predict threat levels for the threats identified, and generate one or more messages or other alerts that can be provided to one or more entities to act on the threats. In some embodiments, the threat assessment service can analyze the threat data by identifying, in the threat data (e.g., in the common vulnerabilities and exposures data if included in the threat data), a particular threat exploiting a software vulnerability or the like, and to filter the threat data based on the threat identified (e.g., by a threat title or name indicated by the common vulnerabilities and exposures data, a filename or other identifier, a description of a vulnerability, or the like). The threat assessment service can be configured to store filtered vulnerability and/or threat data (hereinafter referred to as "filtered threat data"), which can include portions of the threat data that relate to a particular threat.

The threat assessment service can analyze the filtered threat data to determine and/or predict a threat level associated with the threat. The threat assessment service can be configured to determine a trend of mentions of the threat on social media, a severity score for the threat, if exploitations have been observed for the threat, if patches are available for the threat, and based on these and/or other considerations, whether a predicted threat level associated with the threat is low, medium, high, critical, or the like. Based on the determination of the threat level, the threat assessment service can determine if an alert should be generated. If the threat assessment service determines that an alert is to be generated, the threat assessment service can generate the alert and provide the alert to a device associated with a recipient such as, for example, a subscriber device that can be associated with a subscriber or other entity. The subscriber device can be configured to act on the alert in various embodiments, for example, the subscriber device can access a patch for the threat, install new virus definitions that protect against the threat, block certain entities or addresses, combinations thereof, or the like.

It can be appreciated that because the concepts and technologies disclosed herein can use public data sources (e.g., social networking data, open source intelligence, and the like) as the source for the threat data, the functionality illustrated and described herein can be performed to detect and/or predict threats and their associated predicted threat levels and/or predicted risks before an official assessment relating to the risks and/or severity associated with the threat have been released (or even determined in some instances). In particular, the national vulnerability database (or other data source) may not be able to communicate a severity, exploitation history, and/or patch availability information for a particular threat until a considerable amount of time (e.g., two weeks to three weeks) from the release or first detection of a particular threat. Meanwhile, the threat may become a discussion point among various sources of data (e.g., the data sources) almost immediately after a first detection (or potentially even before that), and as such, some embodiments of the concepts and technologies disclosed herein can enable a quick and reliable approach to identifying potential threats, determining predicted threat levels associated with the threat, and acting on the threat (e.g., generating alerts and/or acting on alerts) using publicly available data and open source intelligence in a considerably shorter time frame in some cases (e.g., hours or days after the release or detection of a threat). It should be understood that this example is illustrative, and therefore should not be construed as being limiting in any way.

Similarly, other approaches may exist for prioritizing threats because a large number of threats may exist at any particular time. Other approaches, however, may rely on machine learning and/or artificial intelligence and/or a CVSS score (e.g., as assigned by the various entities such as the data sources) to determine a severity or threat level associated with a particular threat. Embodiments of the concepts and technologies disclosed herein, however, provide the functionality illustrated and described herein for predicting and using predicted threat levels without machine learning, without artificial intelligence, and without a CVSS score, which may not be available for a particular threat for days or weeks after the threat is first detected. As such, embodiments of the concepts and technologies disclosed herein can enable users or other entities to address potential, predicted, and/or actual threats before other technologies would be able to address the threats. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining threat data from two or more publicly available data sources. The two or more publicly available data sources can include a social networking service and the threat data can include two or more social networking messages. The operations further can include determining, based on the threat data, a threat. The threat can have a name that identifies the threat. The operations can further include storing filtered threat data that can be generated by filtering the threat data using the name that identifies the threat. The filtered threat data can include two or more social networking messages, where the two or more social networking messages can mention the name that identifies the threat. The operations also can include analyzing the filtered threat data to determine a mention trend for the threat, a severity score for the threat, an exploitation history for the threat, and a patch availability of the threat; and determining, based on the mention trend, the severity score, the exploitation history, and the patch availability, a threat level for the threat. The threat level can be generated without machine learning and without artificial intelligence. The operations also can include in response to determining, based on the threat level, that an alert should be sent to a subscriber device, generating the alert and sending, directed to the subscriber device, the alert.

In some embodiments, filtering the threat data using the name that identifies the threat can include filtering the two or more social networking messages for social networking messages that mention the name that identifies the threat. In some embodiments, determining the mention trend can include analyzing the two or more social networking messages to determine a number of times the threat has been mentioned, a frequency with which the threat has been mentioned, and a rate at which the frequency is changing over time (where more recent mentions of the threat may be given more weight in some embodiments); and assigning a score to the mention trend, where the score can be a positive if the rate is increasing and the score can be negative if the rate is decreasing.

In some embodiments, determining the exploitation history can include analyzing the two or more social networking messages to determine a number of times exploitations associated with the threat have been mentioned; and assigning a score to the exploitation history, where the score can be a positive integer if the number of times exceeds zero and the score can be zero if the number of times is zero. In some embodiments, determining the severity score can include analyzing the two or more social networking messages to determine a severity associated with the threat based on the two or more social networking messages; and assigning a score to the severity score, where the score assigned to the severity score can correspond to the CVSS score defined for the threat.

In some embodiments, determining the patch availability can include analyzing the two or more social networking messages to determine a number of patches available for the threat; and assigning a score to the patch availability, where the score can be a negative integer corresponding to the number of patches if the number of patches exceeds zero, and where the score can be a positive integer such as a value of one if the number of patches is zero. In some embodiments, the threat level can be a determined without a common vulnerability scoring system score and the threat level can be determined before the common vulnerability scoring system score is available.

According to another aspect of the concepts and technologies disclosed herein, a method is disclosed. The method can include obtaining, at a server computer including a processor, threat data from two or more publicly available data sources. The two or more publicly available data sources can include a social networking service and the threat data can include two or more social networking messages. The method further can include determining, by the processor and based on the threat data, a threat. The threat can have a name that identifies the threat. The method can further include storing, by the processor, filtered threat data that can be generated by filtering the threat data using the name that identifies the threat. The filtered threat data can include two or more social networking messages, where the two or more social networking messages can mention the name that identifies the threat. The method also can include analyzing, by the processor, the filtered threat data to determine a mention trend for the threat, a severity score for the threat, an exploitation history for the threat, and a patch availability of the threat; and determining, by the processor and based on the mention trend, the severity score, the exploitation history, and the patch availability, a threat level for the threat. The threat level can be generated without machine learning and without artificial intelligence. The method also can include in response to determining, based on the threat level, that an alert should be sent to a subscriber device, generating, by the processor, the alert and sending, by the processor and directed to the subscriber device, the alert.

In some embodiments, filtering the threat data using the name that identifies the threat can include filtering the two or more social networking messages for social networking messages that mention the name that identifies the threat. In some embodiments, determining the mention trend can include analyzing the two or more social networking messages to determine a number of times the threat has been mentioned, a frequency with which the threat has been mentioned, and a rate at which the frequency is changing over time (where more recent mentions of the threat may be given more weight in some embodiments); and assigning a score to the mention trend, where the score can be positive if the rate is increasing and the score can be negative if the rate is decreasing.

In some embodiments, determining the exploitation history can include analyzing the two or more social networking messages to determine a number of times exploitations associated with the threat have been mentioned; and assigning a score to the exploitation history, where the score can be a positive integer if the number of times exceeds zero and the score can be zero if the number of times is zero. In some embodiments, determining the severity score can include analyzing the two or more social networking messages to determine a severity associated with the threat based on the two or more social networking messages; and assigning a score to the severity score, where the score assigned to the severity score can correspond to the CVSS score defined for the threat.

In some embodiments, determining the patch availability can include analyzing the two or more social networking messages to determine a number of patches available for the threat; and assigning a score to the patch availability, where the score can be a negative integer corresponding to the number of patches if the number of patches exceeds zero, and where the score can be a positive integer such as a value of one if the number of patches is zero. In some embodiments, the severity score can be determined without a common vulnerability scoring system score and the threat level can be determined before the common vulnerability scoring system score is available.

According to yet another aspect of the concepts and technologies disclosed herein, a computer storage medium is disclosed. The computer storage medium can store computer-executable instructions that, when executed by a processor, cause the processor to perform operations. The operations can include obtaining threat data from two or more publicly available data sources. The two or more publicly available data sources can include a social networking service and the threat data can include two or more social networking messages. The operations further can include determining, based on the threat data, a threat. The threat can have a name that identifies the threat. The operations can further include storing filtered threat data that can be generated by filtering the threat data using the name that identifies the threat. The filtered threat data can include two or more social networking messages, where the two or more social networking messages can mention the name that identifies the threat. The operations also can include analyzing the filtered threat data to determine a mention trend for the threat, a severity score for the threat, an exploitation history for the threat, and a patch availability of the threat; and determining, based on the mention trend, the severity score, the exploitation history, and the patch availability, a threat level for the threat. The threat level can be generated without machine learning and without artificial intelligence. The operations also can include in response to determining, based on the threat level, that an alert should be sent to a subscriber device, generating the alert and sending, directed to the subscriber device, the alert.

In some embodiments, filtering the threat data using the name that identifies the threat can include filtering the two or more social networking messages for social networking messages that mention the name that identifies the threat. In some embodiments, determining the mention trend can include analyzing the two or more social networking messages to determine a number of times the threat has been mentioned, a frequency with which the threat has been mentioned, and a rate at which the frequency is changing over time (where more recent mentions of the threat may be given more weight in some embodiments); and assigning a score to the mention trend, where the score can be positive if the rate is increasing and the score can be negative if the rate is decreasing.

In some embodiments, determining the exploitation history can include analyzing the two or more social networking messages to determine a number of times exploitations associated with the threat have been mentioned; and assigning a score to the exploitation history, where the score can be a positive integer if the number of times exceeds zero and the score can be zero if the number of times is zero. In some embodiments, determining the severity score can include analyzing the two or more social networking messages to determine a severity associated with the threat based on the two or more social networking messages; and assigning a score to the severity score, where the score assigned to the severity score can correspond to the CVSS score defined for the threat.

In some embodiments, determining the patch availability can include analyzing the two or more social networking messages to determine a number of patches available for the threat; and assigning a score to the patch availability, where the score can be a negative integer corresponding to the number of patches if the number of patches exceeds zero, and where the score can be a positive integer such as a value of one if the number of patches is zero. In some embodiments, the threat level can be determined without a common vulnerability scoring system score and the threat level can be determined before the common vulnerability scoring system score is available.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
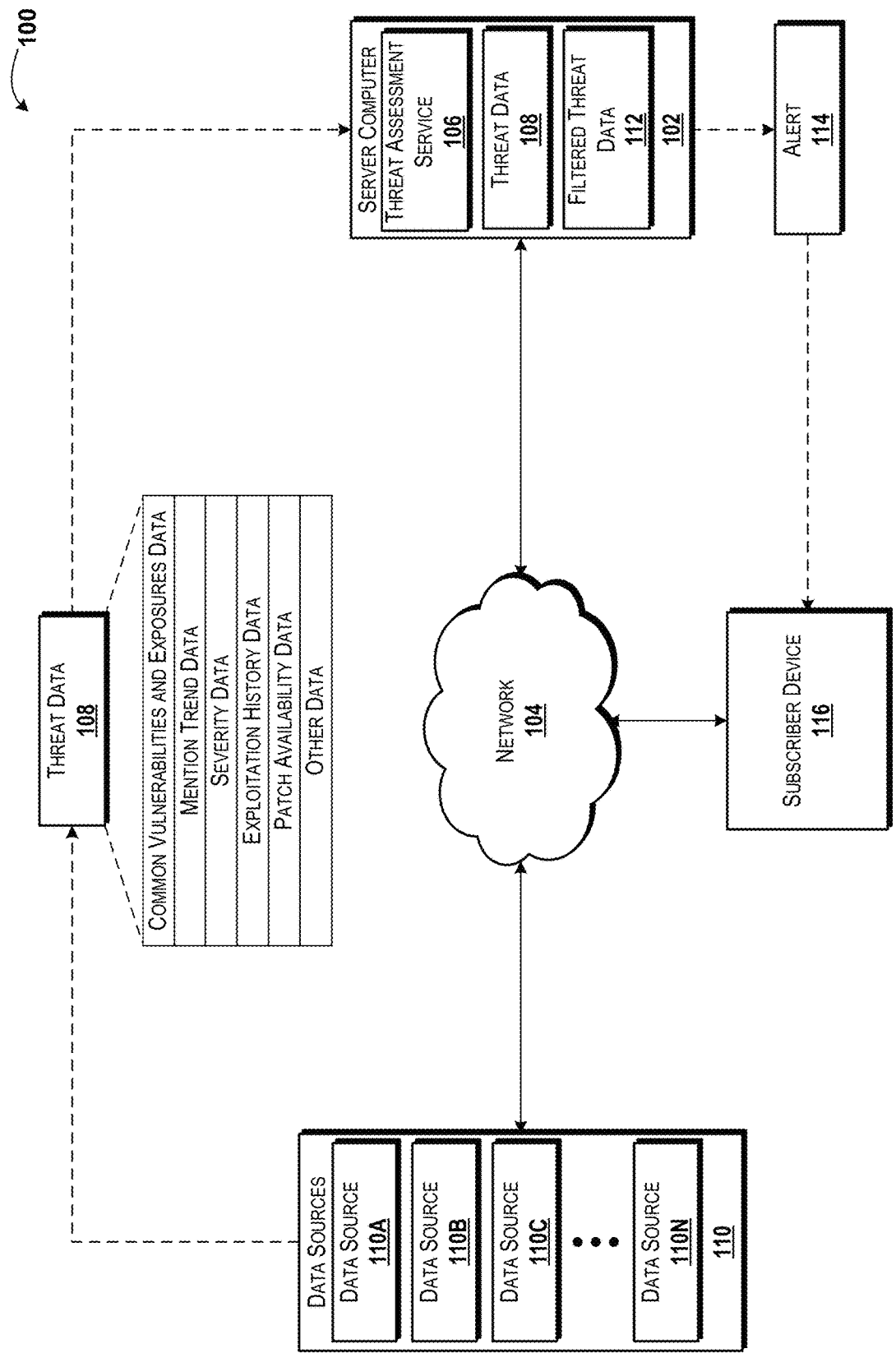
FIG. 1 is a system diagram depicting an illustrative operating environment for various embodiments of the concepts and technologies described herein.

The following detailed description is directed to predicting and using threat levels for cyber threats using data from public data sources. A server computer can execute a threat assessment service. The threat assessment service can be configured to obtain threat data from one or more data sources. The threat data can be obtained from one or more data sources that can be publicly accessible (e.g., not proprietary data sources) including open source intelligence sources such as, for example, one or more devices or resources associated with the NVD, one or more devices or resources associated with a social networking service (e.g., the TWITTER social networking service, or the like), one or more devices or resources associated with the ZDI, one or more devices or resources associated with the EDB, e.g., the website located at www.exploit-db.com, and/or other data sources. Thus, the threat data can include, but is not limited to, common vulnerabilities and exposures data, mention trend data, severity data, exploitation history data, patch availability data, and other data. According to various embodiments of the concepts and technologies disclosed herein, the data sources can include publicly accessible resources, and therefore can also be referred to as OSINT sources.

The common vulnerabilities and exposures data can include information that identifies and/or describes one or more cyber threats exploiting a software vulnerability or the like, which can be released by one of the data sources such as the national vulnerability database and/or accessed at the data source via an API or other functionality. The mention trend data can include information that identifies and/or describes one or more mention trends associated with one or more cyber threats exploiting a software vulnerability or the like, and can be obtained by querying or searching a social networking service (e.g., the TWITTER social networking service) for messages or posts that relate to a particular vulnerability (e.g., a vulnerability identified in the common vulnerabilities and exposures data or the like). The mention trend data can be obtained, in some embodiments, from the data sources as an indication as to how many times and at what rate a particular vulnerability has been mentioned, or the like. In some other embodiments, one of the data sources may provide copies of all messages relating to the identified vulnerability and the threat assessment service can be configured to generate the mention trend data (e.g., by analyzing the time and date information included in the messages to identify the frequency and/or trends associated with the messages).

The severity data can include information that can identify and/or describe one or more predicted or observed severities associated with one or more cyber threats such as a software vulnerability or the like. The severity data can be obtained by querying or searching a social networking service (e.g., the TWITTER social networking service) for messages or posts that relate to a particular vulnerability (e.g., a vulnerability identified in the common vulnerabilities and exposures data, certain exploitations, or the like), by analyzing the common vulnerabilities and exposures data (which may describe how the threat exploits particular vulnerabilities), or the like, and predicting, based on these and/or other types of information, a severity (observed or predicted) associated with the cyber threats. The severity data can indicate, for a particular threat, how serious the threat is predicted or observed to be and/or the seriousness of damage to one or more assets that can be predicted, expected, and/or observed to be caused by the identified threat. In some embodiments, the severity data can correspond to a CVSS score. The severity data can be obtained from the data sources in some instances, or one of the data sources may provide copies of all messages or posts relating to the identified vulnerability and the threat assessment service can be configured to generate the severity data based on analysis of the messages to predict or determine the severity of the threat.

The exploitation history data can include information that can identify and/or describe one or more exploitations or exploitation histories associated with one or more cyber threats such as a software vulnerability or the like, either observed or predicted. The exploitation history data can be obtained by querying or searching a social networking service (e.g., the TWITTER social networking service) for messages or posts that relate to a particular vulnerability (e.g., a vulnerability identified in the common vulnerabilities and exposures data or the like), by analyzing the common vulnerabilities and exposures data (which may describe exploitations by the threat), or the like. The exploitation history data can be obtained from the data sources in some instances, or one of the data sources may provide copies of all messages relating to the identified vulnerability and the threat assessment service can be configured to generate the severity data based on an analysis of the messages for indications associated with exploitations by the threat, predicted and/or observed exploitations associated with the threat and/or the like.

The patch availability data can include information that can identify and/or describe one or more patches and/or patch availabilities associated with one or more cyber threats exploiting a software vulnerability or the like. In some embodiments of the concepts and technologies disclosed herein, the patch availability data can be obtained by querying or searching a social networking service (e.g., the TWITTER social networking service) for messages or posts that relate to a particular vulnerability (e.g., a vulnerability identified in the common vulnerabilities and exposures data or the like), by accessing virus software definition updates, by analyzing the common vulnerabilities and exposures data (which may describe patches available to address the threat), or the like. The patch availability data can be obtained from the data sources or one of the data sources may provide copies of all messages relating to the identified vulnerability and the threat assessment service can be configured to generate the patch availability data based on an analysis of the messages for indications associated with patches for the threat. The other data can include, but is not limited to, other information relating to threats such as a first detection date, a number of detections or exploitations associated with the threat, historical trends associated with the threat (e.g., numbers and/or frequencies of detections or exploitations over time), data that describes vulnerable systems or devices, and/or other information associated with the threats. Thus, it should be understood that according to various embodiments of the concepts and technologies disclosed herein, the threat data and/or components thereof can be released by one of the data sources, accessed at the data source via an API, parsed from data stored by the data source, and/or generated by the threat assessment service based on analysis of other data from the data sources. Because the threat data can be obtained in additional and/or alternative manners, it should be understood that these examples are illustrative, and therefore should not be construed as being limiting in any way.

The threat assessment service can obtain the threat data and store the threat data locally. The threat assessment service can analyze the threat data to identify threats represented by the threat data, predict threat levels for the threats identified, and generate one or more messages or other alerts that can be provided to one or more entities to act on the threats. In some embodiments, the threat assessment service can analyze the threat data by identifying, in the threat data (e.g., in the common vulnerabilities and exposures data if included in the threat data), a particular threat such as a software vulnerability or the like, and to filter the threat data based on the threat identified (e.g., by a threat title or name indicated by the common vulnerabilities and exposures data, a filename or other identifier, a description of the vulnerability, or the like). The threat assessment service can be configured to store filtered threat data, which can include portions of the threat data that relate to a particular threat.

The threat assessment service can analyze the filtered threat data to determine and/or predict a threat level associated with the threat. The threat assessment service can be configured to determine a trend of mentions of the threat on social media, a severity score for the threat, if exploitations have been observed for the threat, if patches are available for the threat, and based on these and/or other considerations, whether a predicted threat level associated with the threat is low, medium, high, critical, or the like. Based on the determination of the threat level, the threat assessment service can determine if an alert should be generated. If the threat assessment service determines that an alert is to be generated, the threat assessment service can generate the alert and provide the alert to a device associated with a recipient such as, for example, a subscriber device that can be associated with a subscriber or other entity. The subscriber device can be configured to act on the alert in various embodiments, for example, the subscriber device can access a patch for the threat, install new virus definitions that protect against the threat, block certain entities or addresses, combinations thereof, or the like.

It can be appreciated that because the concepts and technologies disclosed herein use public data sources (e.g., social networking data, open source intelligence, and the like) as the source for the threat data, the functionality illustrated and described herein can be performed to detect and/or predict threats and their associated observed or predicted threat levels before an official assessment relating to the risks and/or severity associated with the threat have been released (or even determined in some instances). In particular, the national vulnerability database (or other data source) may not be able to communicate a severity score, exploitation history, and/or patch availability information for a particular threat until a considerable amount of time (e.g., two weeks to three weeks) from the release or first detection of a particular threat. Meanwhile, the threat may become a discussion point among various sources of data (e.g., the data sources) almost immediately after a first detection (or even before a first detection in some instances), and as such some embodiments of the concepts and technologies disclosed herein can enable a quick and reliable approach to identifying potential or actual threats, determining predicted threat levels associated with the threat, and acting on the threat (e.g., generating alerts and/or acting on alerts) using publicly available data and open source intelligence in a considerably shorter time frame in some cases (e.g., hours or days after the release or detection of a threat). It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for predicting and using threat levels for cyber threats using data from public data sources will be described, according to an illustrative embodiment. The operating environment 100 shown in FIG. 1 includes a server computer 102. The server computer 102 can operate in communication with and/or as part of a communications network ("network") 104, though this is not necessarily the case in all embodiments of the concepts and technologies disclosed herein.

According to various embodiments, the functionality of the server computer 102 may be provided by one or more server computers, desktop computers, laptop computers, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not illustrated in FIG. 1) and one or more application programs such as, for example, a vulnerability or threat assessment service (hereinafter "threat assessment service") 106. The operating system can include a computer program that can control the operation of the server computer 102. The threat assessment service 106 can include an executable program that can be configured to execute on top of the operating system to provide various functions as illustrated and described herein for predicting and using threat levels for cyber threats using data from public data sources. In some embodiments of the concepts and technologies disclosed herein, the functionality of the threat assessment service 106 can be incorporated into the operating system for the server computer 102. As such, the illustrated embodiment is illustrative and should not be construed as being limiting in any way.

The threat assessment service 106 can be configured to execute the functionality illustrated and described herein for identifying cyber vulnerabilities and cyber threats that are expected or predicted to become serious threats, as will be more clearly understood with reference to the description herein. In particular, the threat assessment service 106 can be configured to obtain and analyze threat data 108 from one or more data sources 110A-N (hereinafter collectively and/or genericly referred to as "data sources 110").

According to various embodiments of the concepts and technologies disclosed herein, the threat data 108 can include, but is not limited to, common vulnerabilities and exposures ("CVE") data, mention trend data, severity data, exploitation history data, patch availability data, and other data, and the data sources 110 can include, for example, one or more devices or resources associated with the NVD, one or more devices or resources associated with a social networking service (e.g., the TWITTER social networking service, or the like), one or more devices or resources associated with the ZDI, one or more devices or resources associated with the EDB, e.g., the website located at www-.exploit-db.com, and/or other data sources 110. According to various embodiments of the concepts and technologies disclosed herein, the data sources 110 can include publicly accessible resources, and therefore can also be referred to as OSINT sources. As such, it should be understood that in the illustrated and described embodiments, the data sources 110 can correspond to what are referred to in the art as open source intelligence sources of data. It should be understood that this example is illustrative, and therefore should not be construed as being limiting in any way.

The common vulnerabilities and exposures data can include information that identifies and/or describes one or more cyber threats exploiting a software vulnerability or the like. In some embodiments of the concepts and technologies disclosed herein, the common vulnerabilities and exposures data can include vulnerabilities identified as CVEs, as generally is understood. According to various embodiments of the concepts and technologies disclosed herein, the common vulnerabilities and exposures data can be released by one of the data sources 110 such as the national vulnerability database and/or accessed at the data source 110 via an API, a portal, and/or other functionality. In some embodiments, for example, the threat assessment service 106 can obtain the common vulnerabilities and exposures data from the data source 110 via accessing the data source 110 via an API to request the common vulnerabilities and exposures data. Because the common vulnerabilities and exposures data can be obtained in additional and/or alternative manners, it should be understood that these examples are illustrative, and therefore should not be construed as being limiting in any way.

The mention trend data can include information that identifies and/or describes one or more mention trends associated with one or more cyber threats exploiting a software vulnerability or the like. It can be appreciated that in some embodiments, as mentions of a particular threat increase, the predicted threat level and/or seriousness associated with the threat can increase as well. In some embodiments of the concepts and technologies disclosed herein, the mention trend data can be obtained by querying or searching a social networking service (e.g., the TWITTER social networking service) for messages or posts that relate to a particular vulnerability (e.g., a vulnerability identified in the common vulnerabilities and exposures data or the like), and determining a trend associated with mentions of the vulnerability in the messages and/or posts. In one contemplated embodiment, the threat assessment service 106 can be configured to perform a keyword search on the TWITTER social networking service for TWEETS that include the keyword "CVE-," as the common vulnerabilities and exposures data can identify specific vulnerabilities in some embodiments using labels or titles that begin with "CVE-" or the like; for mentions of a particular resource or filename associated with a vulnerability and/or threat; for descriptions of a particular vulnerability and/or threat; combinations thereof, or the like, and these messages and/or posts can be analyzed to determine a mention trend associated with the particular identified threat or vulnerability. It should be understood that this example is illustrative, and therefore should not be construed as being limiting in any way.

The mention trend data can be obtained, in some embodiments, from the data sources 110. For example, one of the data sources 110 may provide the mention trend data as an indication as to how many times and at what rate a particular vulnerability has been mentioned, or the like. In some other embodiments, one of the data sources 110 may provide copies of all messages relating to the identified vulnerability and the threat assessment service 106 can be configured to generate the mention trend data (e.g., by analyzing the time and date information included in the messages to identify the frequency and/or trends associated with the messages). Thus, it should be understood that according to various embodiments of the concepts and technologies disclosed herein, the mention trend data can be released by one of the data sources 110, accessed at the data source 110 via an API, parsed from data stored by the data source 110, and/or generated by the threat assessment service 106 based on analysis of other data (e.g., social networking data, other data, or the like) from the data sources 110. Because the mention trend data can be obtained in additional and/or alternative manners, it should be understood that these examples are illustrative, and therefore should not be construed as being limiting in any way.

The severity data can include information that can identify and/or describe one or more predicted or observed severities associated with one or more cyber threats exploiting a software vulnerability or the like. In some embodiments of the concepts and technologies disclosed herein, the severity data can be obtained by querying or searching a social networking service (e.g., the TWITTER social networking service) for messages or posts that relate to a particular vulnerability (e.g., a vulnerability identified in the common vulnerabilities and exposures data, descriptions of vulnerabilities, filenames, or the like), by analyzing the common vulnerabilities and exposures data (which may describe how the threat exploits particular vulnerabilities), or the like. In some embodiments, the severity data can be determined based on a CVSS score or other indicator of severity. The severity data can indicate, for a particular threat, how serious the threat is predicted and/or observed to be and/or the predicted or observed seriousness of damage that can be caused by the threat. For example, a vulnerability that can be exploited to expose a user to unwanted or undesired content may be deemed less serious than a vulnerability that can be exploited to expose personal data of a user to a malicious actor. It should be understood that this example is illustrative, and therefore should not be construed as being limiting in any way.

In some embodiments of the concepts and technologies disclosed herein, the severity data can be obtained from the data sources 110. For example, one of the data sources 110 may provide the severity data as the severity score associated with the threat in some embodiments. In some other embodiments, one of the data sources 110 may provide copies of all messages or posts relating to the identified vulnerability and the threat assessment service 106 can be configured to generate the severity data based on analysis of the messages or posts and a determination of the predicted or observed severity based on the analysis of the messages or posts. Thus, it should be understood that according to various embodiments of the concepts and technologies disclosed herein, the severity data can be released by one of the data sources 110, accessed at the data source 110 via an API, parsed from data stored by the data source 110, and/or generated by the threat assessment service 106 based on analysis of other data from the data sources 110. Because the severity data can be obtained in additional and/or alternative manners, it should be understood that these examples are illustrative, and therefore should not be construed as being limiting in any way.

The exploitation history data can include information that can identify and/or describe one or more predicted or observed exploitations or exploitation histories associated with one or more cyber threats exploiting a software vulnerability or the like. In some embodiments of the concepts and technologies disclosed herein, the exploitation history data can be obtained by querying or searching a social networking service (e.g., the TWITTER social networking service) for messages or posts that relate to a particular vulnerability (e.g., a vulnerability identified in the common vulnerabilities and exposures data or the like), by analyzing the common vulnerabilities and exposures data (which may describe exploitations by the threat), or the like. The exploitation history data can indicate, for a particular vulnerability, actual exploitations by the threat, predicted exploitations by the threat, and/or attempted exploitations by the threat. It should be understood that this example is illustrative, and therefore should not be construed as being limiting in any way.

In some embodiments of the concepts and technologies disclosed herein, the exploitation history data can be obtained from the data sources 110. For example, one of the data sources 110 may provide the exploitation history data as a number of exploitations associated with the threat and/or a predicted amount of exploitations expected for the threat. In some other embodiments, one of the data sources 110 may provide copies of all messages or posts relating to the identified vulnerability and the threat assessment service 106 can be configured to generate the exploitation data based on an analysis of the messages for indications associated with exploitations of the vulnerability by the threat, predicted exploitations of the vulnerability, etc. Thus, it should be understood that according to various embodiments of the concepts and technologies disclosed herein, the exploitation history data can be released by one of the data sources 110, accessed at the data source 110 via an API, parsed from data stored by the data source 110, and/or generated by the threat assessment service 106 based on analysis of other data from the data sources 110. Because the exploitation history data can be obtained in additional and/or alternative manners, it should be understood that these examples are illustrative, and therefore should not be construed as being limiting in any way.

The patch availability data can include information that can identify and/or describe one or more patches and/or patch availabilities associated with one or more cyber threats exploiting a software vulnerability or the like. In some embodiments of the concepts and technologies disclosed herein, the patch availability data can be obtained by querying or searching a social networking service (e.g., the TWITTER social networking service) for messages or posts that relate to a particular vulnerability (e.g., a vulnerability identified in the common vulnerabilities and exposures data or the like), by accessing virus software definition updates, by analyzing the common vulnerabilities and exposures data (which may describe patches available to address the threat), or the like. The patch availability data can indicate, for a particular threat, what patches are available to block or reduce the risk posed by the threat. It should be understood that this example is illustrative, and therefore should not be construed as being limiting in any way.

In some embodiments of the concepts and technologies disclosed herein, the patch availability data can be obtained from the data sources 110. In some other embodiments, one of the data sources 110 may provide copies of all messages or posts relating to the identified vulnerability and the threat assessment service 106 can be configured to generate the patch availability data based on an analysis of the messages for indications associated with patches for the threat. Thus, it should be understood that according to various embodiments of the concepts and technologies disclosed herein, the exploitation history data can be released by one of the data sources 110, accessed at the data source 110 via an API, parsed from data stored by the data source 110, and/or generated by the threat assessment service 106 based on analysis of other data from the data sources 110. Because the exploitation history data can be obtained in additional and/or alternative manners, it should be understood that these examples are illustrative, and therefore should not be construed as being limiting in any way.

The other data can include, but is not limited to, other information relating to threats such as a first detection date, a predicted first detection date, a number of detections or exploitations associated with the threat, historical trends associated with the threat (e.g., numbers and/or frequencies of detections or exploitations over time), data that describes vulnerable systems or devices, and/or other information associated with the threats. Because the other data can include any other information about threats illustrated and described herein, it should be understood that these examples are illustrative, and therefore should not be construed as being limiting in any way.

In some instances, as explained above, the data sources 110 can support access to the threat data 108 (or portions thereof) via one or more APIs, portals, webpages, databases, or the like. In some instances, the threat assessment service 106 can request the threat data 108 via an API or portal, as explained above. In some other embodiments, the threat assessment service 106 can be configured to access a webpage or other resource provided by the data sources 110 and the threat assessment service 106 can be configured to parse the webpage and/or access a threat-specific webpage to obtain the threat data 108. In one example embodiment, the threat data 108 can access a webpage associated with the ZDI (which currently does not support an API call), parse the webpage, and access a page specific to a particular threat. In another contemplated embodiment, the threat assessment service 106 can access a data source 110 associated with the EDB via MITRE (e.g., via https://cve.mitre.org), which can provide a reference map that lists all of the threats that appear on the EDB. It should be understood that these examples are illustrative, and therefore should not be construed as being limiting in any way.

After collecting (or creating) the threat data 108, the threat assessment service 106 can store the threat data 108 locally, if desired. The threat assessment service 106 also can be configured to analyze the threat data 108 to identify predicted or observed threats, predict threat levels for the predicted or observed threats, and generate one or more messages to various entities to act on the predicted or observed threats. In particular, the threat assessment service 106 can be configured to analyze the threat data 108 by identifying, in the threat data 108 (e.g., in the common vulnerabilities and exposures data if included in the threat data 108), a particular threat that is exploiting or expected to exploit a software vulnerability or the like. In some embodiments, the threat can be identified in the threat data 108 by a CVE number (e.g., CVE-2009-4186, CVE-2020-22001, or the like). In some other embodiments, the threat assessment service 106 may identify a threat by a filename or the like (e.g., "meanvirus.exe," or the like). In yet other embodiments, the threat may be identified based on a description of the threat and/or the vulnerability exploited thereby. Thus, in some embodiments of the concepts and technologies disclosed herein, the threat assessment service 106 can begin the analysis of the threat data 108 by searching the threat data 108 for a threat described by the threat data 108. It should be understood that this example is illustrative, and therefore should not be construed as being limiting in any way.

The threat assessment service 106 can be configured to filter the threat data 108 based on the threat identified (e.g., by the common vulnerabilities and exposures data). Thus, for example, the threat assessment service 106 can be configured to filter the threat data 108 for any mentions of the threat identified previously. Thus, for example, the threat assessment service 106 can be configured to search any number of TWEETS or other messages using a keyword such as a title or name of the threat (e.g., CVE-2020-22001, a filename or identifier associated with the threat, a description of a threat, or the like). It can be appreciated that the title or name of the threat can identify the threat in various embodiments. Because the threat data 108 can be filtered based on the name of threat or a title of the threat (as explained above with regard to obtaining the threat data 108), it should be understood that this embodiment is illustrative and should not be construed as being limiting in any way.

The threat assessment service 106 can be configured to store filtered threat data 112, which can include one or more portions of the threat data 108 that relate to a particular threat. The threat assessment service 106 can then analyze the filtered threat data 112. In particular, the threat assessment service 106 can be configured to determine a trend of mentions of the threat on social media (e.g., TWEETS that mention the threat, etc.), to determine a predicted or observed severity score for the threat, determine if exploitations have been observed for the threat (and if so, where and what sort of exploitations have been observed) and/or predicted exploitations for the threat, determine if patches are available for the threat, and determine, based on these and/or other considerations, whether a threat level associated with the threat is predicted to be low, medium, high, critical, or the like.

Based on the determination of the threat level, the threat assessment service 106 can determine if an alert 114 should be generated. The alert 114 can be configured to alert a user, system, or other entity about the threat, and optionally any steps to take to protect against the threat. If the threat assessment service 106 determines that an alert 114 is to be generated, the threat assessment service 106 can generate the alert 114 and provide the alert 114 to a device associated with a recipient such as, for example, a subscriber device 116 associated with a subscriber. The subscriber device 116 can be configured to act on the alert 114 in various embodiments. For example, the subscriber device 116 can be configured to access a patch for the threat, to install new virus definitions, to block certain entities or addresses, combinations thereof, or the like. It should be understood that this example is illustrative, and therefore should not be construed as being limiting in any way.

It can be appreciated that because the concepts and technologies disclosed herein use public data sources (e.g., open source intelligence), the functionality illustrated and described herein can be performed to detect and/or predict threats and assess their associated predicted threat levels and/or predicted or observed risks before an official assessment relating to the risks and/or severity associated with the threat have been released (or even determined) using other technologies. In particular, the national vulnerability database (or other data source 110) may not be able to communicate a severity, exploitation history, and/or patch availability information for a particular threat until a considerable amount of time (e.g., two weeks to three weeks) from the release or first detection of a particular threat. Embodiments of the concepts and technologies disclosed herein, however, can be used to predict a threat level and/or risk before the passage of such time.

In particular, the predicted or observed threat may become a discussion point and may be represented among various sources of data (e.g., the data sources 110) almost immediately after or even before a first detection in some instances, and as such some embodiments of the concepts and technologies disclosed herein can enable a quick and reliable approach to identifying predicted or observed threats, determining predicted threat levels associated with the predicted or observed threat, and acting on the predicted or observed threat (e.g., generating alerts 114 and/or acting on alerts 114) using publicly available data and open source intelligence in a considerably shorter time frame in some cases (e.g., hours or days after the release or detection of a threat) than would be possible using traditional approaches (e.g., waiting for a CVSS score, for example). Thus, some embodiments of the concepts and technologies disclosed herein can be used to enable dedication of vulnerability remediation resources to only those threats that are predicted to be the most severe by the threat assessment service 106. It should be understood that this example is illustrative, and therefore should not be construed as being limiting in any way.

In practice a server computer 102 can execute a threat assessment service 106. The threat assessment service 106 can be configured to obtain threat data 108 from one or more data sources 110. The threat data 108 can be obtained from one or more data sources 110 that can be publicly accessible (e.g., not proprietary data sources) including open source intelligence sources such as, for example, one or more devices or resources associated with the NVD, one or more devices or resources associated with a social networking service (e.g., the TWITTER social networking service, or the like), one or more devices or resources associated with the ZDI, one or more devices or resources associated with the EDB, and/or other data sources 110. Thus, the threat data 108 can include, but is not limited to, common vulnerabilities and exposures data, mention trend data, severity data, exploitation history data, patch availability data, and other data.

The common vulnerabilities and exposures data can include information that identifies and/or describes one or more cyber threats exploiting a software vulnerability or the like, which can be released by one of the data sources 110 such as the national vulnerability database and/or accessed at the data source 110 via an API, a portal, or other functionality. The mention trend data can include information that identifies and/or describes one or more mention trends associated with one or more cyber threats exploiting a software vulnerability or the like, and can be obtained by querying or searching a social networking service (e.g., the TWITTER social networking service) for messages or posts that relate to a particular vulnerability (e.g., a vulnerability identified in the common vulnerabilities and exposures data or the like). The mention trend data can be obtained, in some embodiments, from the data sources 110 as an indication as to how many times and at what rate a particular vulnerability has been mentioned, or the like. In some other embodiments, one of the data sources 110 may provide copies of all messages relating to the identified vulnerability and the threat assessment service 106 can be configured to generate the mention trend data (e.g., by analyzing the time and date information included in the messages to identify the frequency and/or trends associated with the messages).

The severity data can include information that can identify and/or describe one or more predicted or observed severities associated with one or more cyber threats exploiting a software vulnerability or the like. The severity data can be obtained by querying or searching a social networking service (e.g., the TWITTER social networking service) for messages or posts that relate to a particular vulnerability (e.g., a vulnerability identified in the common vulnerabilities and exposures data or the like), by analyzing the common vulnerabilities and exposures data (which may indicate a CVSS score or can describe how the threat exploits particular vulnerabilities), or the like. The severity data can indicate, for a particular threat, how serious the threat is expected or predicted to be and/or the seriousness of damage that is expected or predicted to be caused by the threat. The severity data can be obtained from the data sources 110 or one of the data sources 110 may provide copies of all messages or posts relating to the identified vulnerability and the threat assessment service 106 can be configured to generate the severity data based on analysis of the messages or posts.

The exploitation history data can include information that can identify and/or describe one or more predicted or observed exploitations or predicted or observed exploitation histories associated with one or more cyber threats such as a software vulnerability or the like. The exploitation history data can be obtained by querying or searching a social networking service (e.g., the TWITTER social networking service) for messages or posts that relate to a particular vulnerability (e.g., a vulnerability identified in the common vulnerabilities and exposures data or the like), by analyzing the common vulnerabilities and exposures data (which may describe exploitations by the threat), or the like. The exploitation history data can be obtained from the data sources 110 or one of the data sources 110 may provide copies of all messages relating to the identified vulnerability and the threat assessment service 106 can be configured to generate the severity data based on an analysis of the messages for indications associated with predicted or observed exploitations by the threat.

The patch availability data can include information that can identify and/or describe one or more patches and/or patch availabilities associated with one or more cyber threats exploiting a software vulnerability or the like. In some embodiments of the concepts and technologies disclosed herein, the patch availability data can be obtained by querying or searching a social networking service (e.g., the TWITTER social networking service) for messages or posts that relate to a particular vulnerability (e.g., a vulnerability identified in the common vulnerabilities and exposures data or the like), by accessing virus software definition updates, by analyzing the common vulnerabilities and exposures data (which may describe patches available to address the threat), or the like. The patch availability data can be obtained from the data sources 110 or one of the data sources 110 may provide copies of all messages relating to the identified vulnerability and the threat assessment service 106 can be configured to generate the patch availability data based on an analysis of the messages for indications associated with patches for the threat. The other data can include, but is not limited to, other information relating to threats such as a first detection date, a predicted first detection date, a number of detections or exploitations associated with the threat, historical trends associated with the threat (e.g., numbers and/or frequencies of detections or exploitations over time), data that describes vulnerable systems or devices, and/or other information associated with the threats. Thus, it should be understood that according to various embodiments of the concepts and technologies disclosed herein, the threat data 108 and/or components thereof can be released by one of the data sources 110, accessed at the data source 110 via an API, parsed from data stored by the data source 110, and/or generated by the threat assessment service 106 based on analysis of other data from the data sources 110. Because the threat data 108 can be obtained in additional and/or alternative manners, it should be understood that these examples are illustrative, and therefore should not be construed as being limiting in any way.

The threat assessment service 106 can obtain the threat data 108 and store the threat data 108 locally. The threat assessment service 106 can analyze the threat data 108 to identify threats represented by the threat data 108, predict threat levels for the threats identified, and generate one or more messages or other alerts 114 that can be provided to one or more entities to act on the threats. In some embodiments, the threat assessment service 106 can analyze the threat data 108 by identifying, in the threat data 108 (e.g., in the common vulnerabilities and exposures data if included in the threat data 108), a particular threat exploiting or predicted to exploit a software vulnerability or the like, and to filter the threat data 108 based on the threat identified (e.g., by a threat title or name indicated by the common vulnerabilities and exposures data). The threat assessment service 106 can be configured to store filtered threat data 112, which can include portions of the threat data 108 that relate to a particular threat.

The threat assessment service 106 can analyze the filtered threat data 112 to determine a predicted threat level associated with the threat. The threat assessment service 106 can be configured to determine a trend of mentions of the threat on social media, a severity score for the threat, if exploitations have been observed for the threat, if patches are available for the threat, and based, on these and/or other considerations, whether a threat level associated with the threat is low, medium, high, critical, or the like. Based on the determination of the threat level, the threat assessment service 106 can determine if an alert 114 should be generated. If the threat assessment service 106 determines that an alert 114 is to be generated, the threat assessment service 106 can generate the alert 114 and provide the alert 114 to a device associated with a recipient such as, for example, a subscriber device 116 that can be associated with a subscriber or other entity. The subscriber device 116 can be configured to act on the alert 114 in various embodiments, for example, the subscriber device 116 can access a patch for the threat, install new virus definitions that protect against the threat, block certain entities or addresses, combinations thereof, or the like.

It can be appreciated that other approaches are possible for prioritizing threats as a large number of threats may exist at any particular time. Other approaches, however, may rely on machine learning and/or artificial intelligence and/or the use of a CVSS score (e.g., as assigned by the various entities such as the data sources 110) to determine a severity associated with a particular threat. Embodiments of the concepts and technologies disclosed herein, however, can provide the functionality illustrated and described herein for predicting and using threat levels without machine learning, without artificial intelligence, and without a CVSS score. A CVSS score, for example, may not be available for a particular threat for days or weeks after the threat is first detected, and machine learning and/or artificial intelligence may not accurately predict threat levels. As such, embodiments of the concepts and technologies disclosed herein can enable users or other entities to address threats before other technologies would be able to address the threats. It should be understood that this example is illustrative, and therefore should not be construed as being limiting in any way.

FIG. 1 illustrates one server computer 102, one network 104, four data sources 110, and one subscriber device 116. It should be understood, however, that various implementations of the operating environment 100 can include one or more than one server computer 102; one or more than one network 104; one, two, three, four, or more than four data sources 110; and/or zero, one, or more than one subscriber device 116. As such, the illustrated embodiment should be understood as being illustrative, and should not be construed as being limiting in any way.

Figure 2:
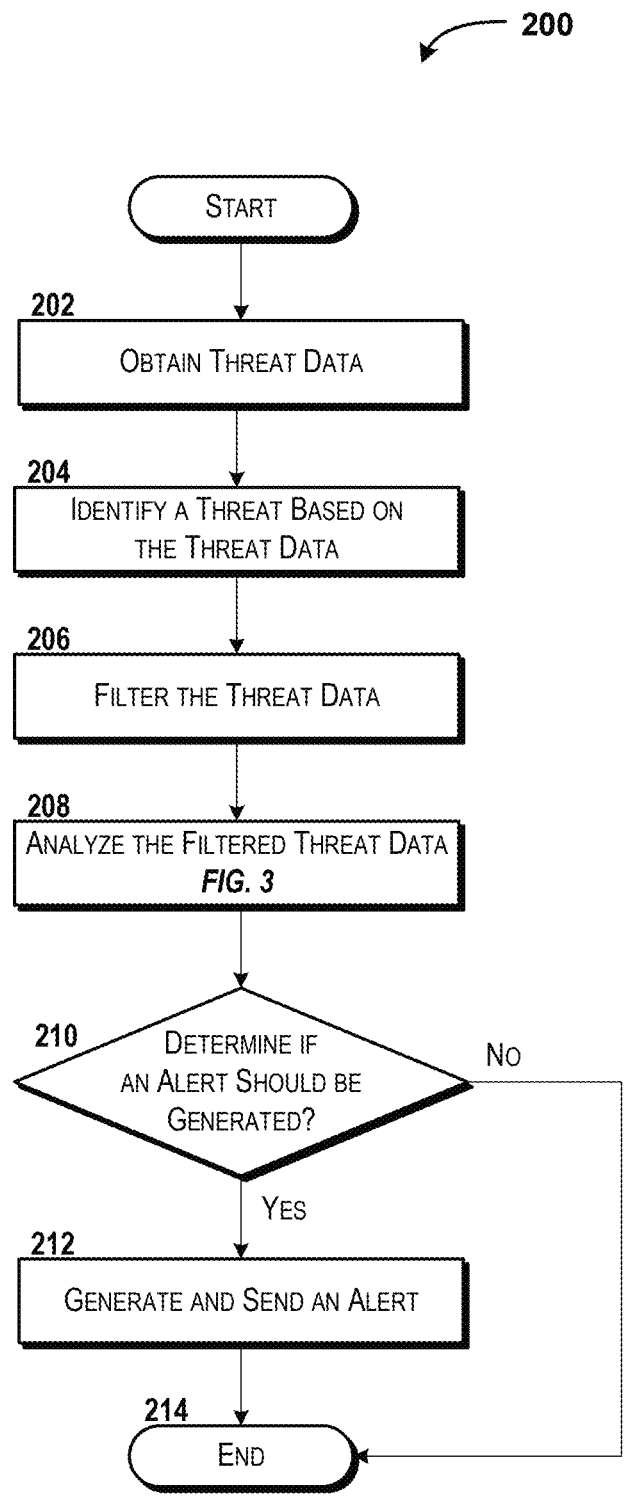
FIG. 2 is a flow diagram showing aspects of a method for predicting and using threat levels for cyber threats using data from public data sources, according to an illustrative embodiment of the concepts and technologies described herein.

Turning now to FIG. 2, aspects of a method 200 for predicting and using threat levels for cyber threats using data from public data sources will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the threat assessment service 106. It should be understood that additional and/or alternative devices and/or network nodes can provide the functionality described herein via execution of one or more modules, applications, and/or other software including, but not limited to, the threat assessment service 106. Thus, the depicted embodiments are illustrative, and should not be viewed as being limiting in any way.

The method 200 begins at operation 202. At operation 202, the server computer 102 can obtain threat data 108. According to some embodiments of the concepts and technologies disclosed herein, the threat data 108 can be published by one or more of the data sources 110 at various times such as, for example, when a new threat is detected; on request from the server computer 102; on an hourly, daily, weekly, or monthly basis; when instructed by other devices; and/or at other times. In some other embodiments, the server computer 102 can request the threat data 108 from one or more of the data sources 110 via an API, service call, portal and/or other functionality. Thus, it should be understood that operation 202 can include the server computer 102 receiving the threat data 108 without any request and/or receiving the threat data 108 in response to a call, request, query, or the like.

As explained above, the threat data 108 obtained in operation 202 can be obtained from one or more public sources and/or OSINT sources such as, for example, one or more sites, devices, and/or resources associated with the NVD, social networking sites or services, the ZDI, the EDB, combinations thereof, or the like. As such, it can be appreciated that the threat data 108 can include publicly available data such as social networking posts, social networking messages, dark web content, forum content, and/or other data as illustrated and described herein, combinations thereof, or the like. The threat data 108 can be filtered and/or analyzed in some embodiments by one or more of the data sources 110, while in some other embodiments the server computer 102 can be configured to obtain the threat data 108 and analyze the data as illustrated and described herein. It should be understood that this example is illustrative, and therefore should not be construed as being limiting in any way.

From operation 202, the method 200 can proceed to operation 204. At operation 204, the server computer 102 can identify a threat based on the threat data 108. In some embodiments, the server computer 102 can identify the threat based on common vulnerabilities and exposures data included in the threat data 108. Thus, for example, the server computer 102 can identify a specific threat by recognizing a named or titled threat (e.g., a threat with a CVE number assigned by the NVD and/or other entities), a description of the threat, or other identifying information. It should be understood that this example is illustrative, and therefore should not be construed as being limiting in any way.

From operation 204, the method 200 can proceed to operation 206. At operation 206, the server computer 102 can filter the threat data 108. In some embodiments, the server computer 102 can filter the threat data 108 in operation 206 based on a threat identified in operation 204. Thus, for example, if the threat identified in operation 204 has a title or name (e.g., a name of an executable file such as "gruadvrm.exe" or an assigned vulnerability number or title such as CVE-2024-13581, or the like), the server computer 102 can filter the threat data on the title or name identified in operation 204.

Thus, for example, if the threat data 108 includes a release of social networking data, the social networking data of the threat data 108 can be filtered on the title or name to identify only those messages or posts that relate or mention the threat identified in operation 204. It should be understood that in various embodiments of the concepts and technologies disclosed herein, the filtering operation illustrated and described herein can include an additional query, application call, or request for threat data 108 that relates to the threat identified in operation 204. Thus, for example, the server computer 102 can query or request threat data 108 from one or more data sources 110 where the request or query specifies the title or name. It should be understood that this example is illustrative, and therefore should not be construed as being limiting in any way.

Regardless of how the threat data 108 is filtered (and/or if additional threat data 108 is obtained at operation 206), the server computer 102 can generate filtered threat data 112, which can relate to the threat identified in operation 204. The filtered threat data 112 can be stored at the server computer 102 and/or at one or more data storage devices or resources accessible to the server computer 102. It should be understood that this example is illustrative, and therefore should not be construed as being limiting in any way.

From operation 206, the method 200 can proceed to operation 208. At operation 208, the server computer 102 can analyze the filtered threat data 112. Additional details of operation 208 will be illustrated and described below with reference to FIG. 3. Briefly, however, the server computer 102 can analyze the filtered threat data 112 to determine a predicted threat level associated with the threat. This threat level can be based, in some embodiments, on one or more of a trend of mentions of the threat on social media (e.g., TWEETS that mention the threat, posts about the threat on a forum, posts on websites, mentions in dark web content, etc.); on a determined severity score for the threat (e.g., a threat that is expected or predicted to be posed by the vulnerability if installed or used by a device); a determined or predicted exploitation history observed for the threat; a determination as to whether patches or other remedial actions are available for the threat; and the like. These and/or other considerations can be used by the server computer 102 to identify, predict, and/or determine a threat level associated with the threat identified in operation 204. It should be understood that this example is illustrative, and therefore should not be construed as being limiting in any way.

From operation 208, the method 200 can proceed to operation 210. At operation 210, the server computer 102 can determine, based on the predicted threat level determined by analyzing the filtered threat data 112, if an alert 114 should be generated. In some embodiments of the concepts and technologies disclosed herein, as will be explained below with reference to FIG. 3, thresholds or cutoffs can be defined for various parameters used to generate the threat level, and the threat level can be defined as low, medium, high, or critical; with alerts 114 being generated for anything over a low risk. In some other embodiments, a numerical value can be determined as the threat level and thresholds can be defined for the threat level with scores above the thresholds resulting in generating an alert 114, for example. Because the determination of whether an alert 114 should be generated based on the determined threat level can be accomplished in various manners, it should be understood that these examples are illustrative, and therefore should not be construed as being limiting in any way.

If the server computer 102 determines, in operation 210, that the alert 114 should be generated, the method 200 can proceed to operation 212. At operation 212, the server computer 102 can generate and provide an alert 114 to a subscriber such as the subscriber device 116. The alert 114 can inform the subscriber as to the threat, details about the severity of the threat, remedial actions that may be available (e.g., a link to a patch), combinations thereof, or the like. An example alert 114 will be illustrated and described hereinbelow with reference to FIG. 4.

From operation 212, the method 200 can proceed to operation 214. The method 200 can end at operation 214.

Figure 3:
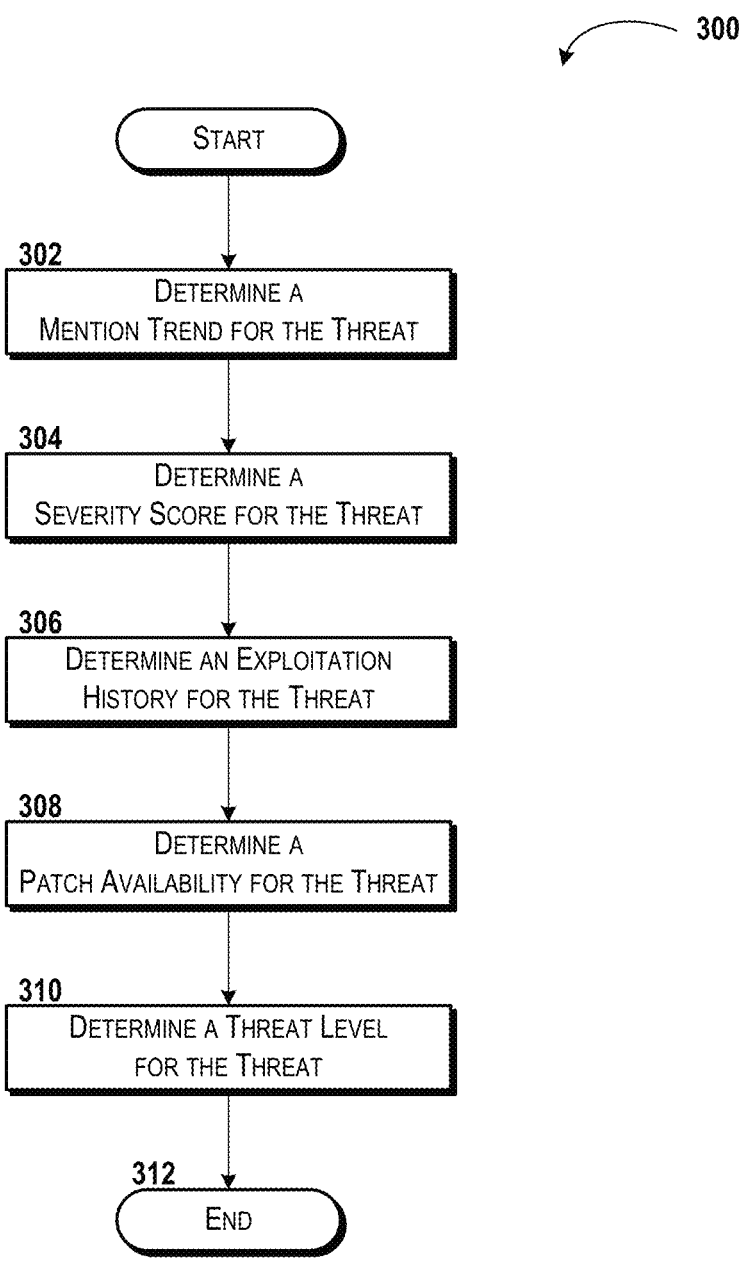
FIG. 3 is a flow diagram showing aspects of a method for analyzing threat data to determine a threat level, according to an illustrative embodiment of the concepts and technologies described herein.

Turning now to FIG. 3, aspects of a method 300 for analyzing threat data to determine a predicted threat level will be described in detail, according to an illustrative embodiment. For purposes of illustrating and describing the concepts of the present disclosure, the method 300 is described herein as being performed by the server computer 102 via execution of one or more software modules such as, for example, the threat assessment service 106. It should be understood that additional and/or alternative devices and/or network nodes can provide the functionality described herein via execution of one or more modules, applications, and/or other software including, but not limited to, the threat assessment service 106. Thus, the illustrated embodiments are illustrative, and should not be viewed as being limiting in any way.

The method 300 begins at operation 302. At operation 302, the server computer 102 can determine or predict a mention trend for the threat. In some embodiments, the server computer 102 can determine the mention trend by determining a trend associated with mentions of the threat on social media (e.g., in TWITTER posts, or the like). It should be understood that this example is illustrative, and therefore should not be construed as being limiting in any way. In some embodiments of operation 302, the server computer 102 can analyze the filtered threat data 112 to identify, in the filtered threat data 112, messages or posts that relate to the threat identified by the server computer 102 (e.g., in operation 204 of the method 200 illustrated and described with reference to FIG. 2 above). In some embodiments of operation 302, the server computer 102 can perform a keyword search through the filtered threat data 112 (or the threat data 108) for messages or posts that mention a keyword defined for the threat such as, for example, a name of the threat, a title of the threat, a filename associated with the threat, and/or the like.

After identifying all of the posts or messages in the filtered threat data 112 that relate to the threat, the server computer 102 can analyze the messages or posts and metadata associated with the messages or posts (e.g., the time and date of each message or post, an author associated with each message or post, etc.) to determine a trend associated with mentions of the threat. The trend can reflect, for example, a date and time of a first mention of the threat; a number of mentions per hour, day, or week associated with the threat since the first mention of threat; a rate of growth (positive or negative) associated with mentions of the threat; and the like.

According to various embodiments of the concepts and technologies disclosed herein, the server computer 102 can apply one or more thresholds to the trend determined in operation 302. In particular, the server computer 102 can be configured to assign a positive or negative score to the trend determined in operation 302 (e.g., an increase in the frequency with which the threat is mentioned can be defined as positive and a decrease in the frequency with which the threat is mentioned can be defined as negative and the rate of growth can be expressed in numerical terms). Furthermore, in some embodiments, recent mentions of the threat (e.g., mentions within the past hour, day, week, or the like) may be given more weight than older mentions of the threat (e.g., mentions older than one week, one day, or one hour, or the like).

The recency of the mentions can affect the positive or negative score assigned to the trend in some embodiments, for example, more recent mentions of the threat can increase the score assigned and less recent (i.e., older) mentions can decrease the score. It should be understood that this example is illustrative, and therefore should not be construed as being limiting in any way. Thus, for example, a mention rate that is growing at a rate of twenty percent per day could be expressed in some embodiments as positive one point two (e.g., +1.2) in some embodiments, while a mention rate that is decreasing by a rate of five percent per day could be expressed in some embodiments as negative one point zero five (e.g., −1.05).

In these and/or other embodiments, mentions of the threat that occurred within a defined time period (e.g., less than or within one hour from a current time, less than or within one day from the current time, less than or within one week from the current time, or the like) may be given more weight than mentions of the threat that occurred outside the defined time period (e.g., equal to or more than one week from a current time, equal to or more than one day from the current time, equal to or more than one hour from the current time, or the like). It can be appreciated that any increase could be seen, in some embodiments, as predicting or indicating a growing threat and any decrease could be seen, in some embodiments, as a diminishing threat. Because other scores are possible and are contemplated, it should be understood that the above examples are illustrative, and therefore should not be construed as being limiting in any way.

Other trends of mentions may also be identified in operation 302. For example, authorship associated with posts or messages may be significant as authoritative entities posting about the threat could be interpreted by the server computer 102 as indicating a more serious threat (e.g., a threat that is predicted to be more serious) than would be the case if the threat was mentioned only in comments, posts, or messages from unknown or untrustworthy entities. Thus, operation 302 also can include assigning, to each post, message, or comment, a neutral, negative, or positive author indicator, with known and/or respected authors' posts, messages, or comments being weighted more than unknown authors or authors who are not respected. It should be understood that this example is illustrative, and therefore should not be construed as being limiting in any way.

From operation 302, the method 300 can proceed to operation 304. At operation 304, the server computer 102 can determine a predicted severity score associated with the threat. The server computer 102 can determine, for the threat identified, a predicted severity associated with installation of and/or an encounter with the threat. The severity score determined in operation 304 can indicate, for a particular threat, how serious the threat is and/or the seriousness of damage that can be caused by the threat. For example, a vulnerability that can be exploited to enable an entity to gain control of a user's computer or device may be rated as or predicted to be a critical threat, while another threat that may exploit a vulnerability to attempt to direct the user's computer or device browser to marketing material, or the like, may be defined as or predicted to be a low threat.

In some embodiments, the factors weighed when assigning predicted or observed severity score can include, but are not limited to, whether the threat can install software on a computer without authorization, whether the threat can track input at the computer (e.g., a key logger), whether the threat can obtain data from the computer without authorization, whether the threat can direct a browser or other software at the computer to connect to specific online locations, combinations thereof, or the like. Each factor can have a score of zero or one (no or yes; false or true; etc.) and any threat that satisfies more than one factor can be predicted to have a high severity score. In some other embodiments, some factors may not be scored evenly and any threat that satisfies certain factors may be deemed serious, critical, or the like. Thus, threat levels can be defined and various factors can be defined for weighting to determine the severity score associated with a threat.

It should be understood that the severity associated with a threat can also be obtained, in some embodiments, from social networking data. For example, the filtered threat data 112 can be analyzed by the server computer 102 to determine if the threat is referred to in the filtered threat data 112 as a "serious threat," "a critical threat," or the like. If the server computer 102 determines that the threat is referred to as a "serious threat" the server computer 102 can determine or predict in operation 304 that the threat has a severity score of high, critical, or the like. Because severity can be determined or predicted in additional and/or alternative manners, it should be understood that these examples are illustrative, and therefore should not be construed as being limiting in any way.

In some embodiments of the concepts and technologies disclosed herein, the score that is assigned to the severity score can correspond to a severity, for example the CVSS score, that is defined for the threat. As such, the score that is assigned to the severity score can correspond to the CVSS score in some embodiments. In some other embodiments, various values can be assigned based on a severity determined for the threat. For example, a score of a first value such as zero can be assigned for the severity score if the predicted severity for the threat is determined to be low. In some embodiments, a score of a second value such as one can be assigned for the severity score if the predicted severity for the threat is determined to be medium; a score of a third value such as two can be assigned for the severity score if the predicted severity for the threat is determined to be high; and a score of a fourth value such as three can be assigned for the severity score if the predicted severity for the threat is determined to be critical. In some other embodiments, the CVSS score defined for the threat can be used as the severity. Because the severity score that is associated with the threat can be determined and/or treated in additional and/or alternative manners, it should be understood that these examples are illustrative, and therefore should not be construed as being limiting in any way.

From operation 304, the method 300 can proceed to operation 306. At operation 306, the server computer 102 can determine an exploitation history associated with the threat or predict an exploitation profile for the threat. For example, in operation 306 the server computer 102 can determine, for the threat identified, a number of times exploitations associated with the threat have been mentioned in the filtered threat data 112 such as, for example, social networking data, discussion groups, etc., or other predicted exploitation information. For example, the filtered threat data 112 can be analyzed by the server computer 102 to determine if exploitations associated with the threat are mentioned in the filtered threat data 112, planned by malicious actors, or the like. For example, a message or post such as "my computer was hacked by someone using a file called nstyvrs.exe," "just read a report about exploitations by CVE-2024-23153," or the like, may be determined by the server computer 102 as indicating a predicted or observed exploitation of a vulnerability. If the server computer 102 determines that the threat is associated with exploitations and/or is predicted to be exploited, the server computer 102 can track a number of exploitations or expected exploitations and assign an exploitation history based on the number of exploitations.

In some embodiments of the concepts and technologies disclosed herein, a threat for which no exploitations have been detected may have a score of zero assigned to the threat or otherwise can be treated so that the exploitation history is neutral, while in some other embodiments, a threat that is predicted to have a number of exploitations may be scored as if the predicted exploitations had already occurred. In some embodiments, any threat with one or more exploitations can have a score of positive one and/or otherwise may be treated in a manner that increases the threat level associated with the threat (e.g., the value can be incremented for each exploitation detected). Because exploitation histories can be determined, predicted, and/or treated in additional and/or alternative manners, it should be understood that these examples are illustrative, and therefore should not be construed as being limiting in any way.

From operation 306, the method 300 can proceed to operation 308. At operation 308, the server computer 102 can determine a patch availability for the threat. In operation 308, the server computer 102 can determine the patch availability by determining if patches are available for the threat and, if so, how many patches are available. The server computer 102 can determine, for the threat identified, whether any patches or other remediation is or are available for the threat (e.g., a virus definition, a new version of software, a patch, etc.) and, if so, the availability of the patches or the like. The server computer 102 can make the determine of operation 308, in some embodiments, by determining a number of messages or posts that mention a solution (e.g., a patch, or the like) for the threat in the filtered threat data 112 such as, for example, social networking data, discussion groups, etc. For example, the filtered threat data 112 can be analyzed by the server computer 102 to determine how many messages mention patches or other fixes for the threat, a number of fixes or patches available, and the like. For example, a message or post such as "new patch released for CVE-2024-23153" could be counted as one patch. If the server computer 102 determines that one or more patches are available for the threat, the server computer 102 can assign a score for the patch availability factor.

In some embodiments of the concepts and technologies disclosed herein, a threat for which no patches exist may have a score of one or more. In some embodiments, any threat with one or more patches can have a score of negative one or more (e.g., the value can be incremented for each patch detected) and/or otherwise may be treated in a manner that decreases the threat level associated with the threat for each available patch or other fix. Because patch availability can be determined and/or treated in additional and/or alternative manners, it should be understood that these examples are illustrative, and therefore should not be construed as being limiting in any way.

From operation 308, the method 300 can proceed to operation 310. At operation 310, the server computer 102 can determine a predicted threat level associated with the threat. It can be appreciated that "determining" the threat level in operation 310 can correspond to "predicting" the threat level because the threat level of the threat may not yet be known using traditional methods (e.g., an assigned CVSS score, machine learning, artificial intelligence, etc.), and therefore the use of the word "determining" herein and in the claims for the threat level and the various factors used herein to determine the threat level can refer to predicting the threat level and/or various factors. It should be understood that this example is illustrative, and therefore should not be construed as being limiting in any way.

In various embodiments of the concepts and technologies disclosed herein, the server computer 102 can add the scores determined in operations 302-308 to determine the predicted threat level for the threat. For example, a threat that sees a mention trend value of twenty percent growth (e.g., a value of +1.2), a severity score of medium (e.g., a value of +1), an exploitation history showing three exploitations (e.g., a value of +3), and a patch availability showing two patches available (e.g., a score of −2) can be determined by the server computer 102 in operation 310 to have a predicted threat level of 3.2 (e.g., 1.2+1+3+(−2)=3.2). This value can be used to determine if an alert 114 should be generated, in some embodiments.

In particular, in some embodiments any predicted threat level over a value of one can be determined by the server computer 102 (e.g., in operation 210 of the method 200 shown in FIG. 2) to be serious enough to warrant generating and sending an alert 114. In some other embodiments, any predicted threat level over a value of two can be determined by the server computer 102 (e.g., in operation 210 of the method 200 shown in FIG. 2) to be serious enough to warrant generating and sending an alert 114. It should be understood that the values above are illustrative of one contemplated embodiment and that the values can be determined in additional and/or alternative manners. Furthermore, it can be appreciated that the threshold value for generating and/or sending an alert 114 can be determined in additional and/or alternative manners. Thus, it should be understood that these examples are illustrative, and therefore should not be construed as being limiting in any way.

From operation 310, the method 300 can proceed to operation 312. The method 300 can end at operation 312.

Figure 4:
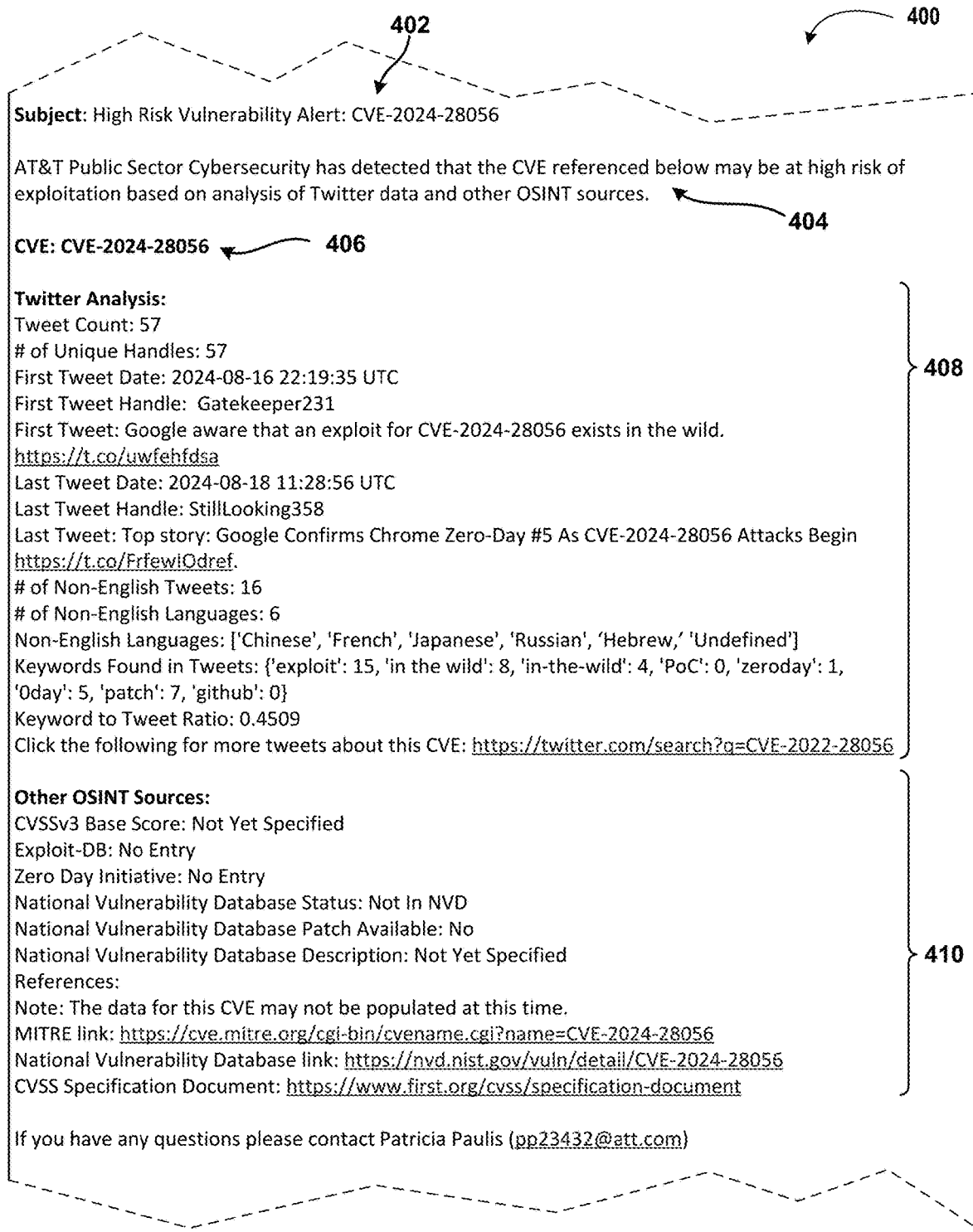
FIG. 4 is a line drawing showing an example embodiment of an alert, according to some illustrative embodiments of the concepts and technologies described herein.

Turning now to FIG. 4, an alert 114 is illustrated and described, according to an example embodiment of the concepts and technologies disclosed herein. In the embodiment shown in FIG. 4, the alert 114 is illustrated as being provided as a portion of an email (hereinafter referred to as an "email 400"). It should be understood that this example is illustrative, and therefore should not be construed as being limiting in any way.

As shown in FIG. 4, the example email 400 can include a subject 402. In the example embodiment, the subject 402 corresponds to a particular threat such as a CVE number assigned to the threat by the NVD or other data source 110, a filename or identifier of a particular threat, a description of a vulnerability, or the like. In the illustrated embodiment, the alert 114 represented by the email 400 can relate to the threat entitled CVE-2024-28056. It should be understood that this example is illustrative, and therefore should not be construed as being limiting in any way.

The email 400 can include an introduction or caption (hereinafter "caption 404"), which can explain the content of the email 400. The email 400 also can indicate the title of the threat using a threat identifier 406. In the illustrated embodiment, the threat identified by the threat identifier 406 is also identified in the subject 402. It should be understood that this example is illustrative, and therefore should not be construed as being limiting in any way.

In the illustrated email 400, a social networking analysis section 408 can be included. In the illustrated embodiment, the social networking analysis section 408 can provide information about a social networking analysis performed by the threat assessment service 106 such as, for example, an analysis of social networking messages or posts as illustrated and described herein. In the illustrated embodiment, the social networking analysis section 408 shows results of an analysis (or analyses) of TWITTER data. It should be understood that this example is illustrative, and therefore should not be construed as being limiting in any way. The illustrated social networking analysis section 408 provides a presentation of a number of messages or posts (e.g., the TWEET count) that relate to the threat, a number of unique authors associated with those messages or posts (e.g., handles) that relate to the threat, a first TWEET date for the first TWEET that relates to the threat, a last TWEET date for a last TWEET relating the threat, and/or other information associated with the social networking data. It should be understood that this example is illustrative, and therefore should not be construed as being limiting in any way.

The example email 400 also includes an OSINT source section 410. In the illustrated embodiment, the OSINT source section 410 can provide information about other public data sources 110 (e.g., OSINT sources) utilized by the threat assessment service 106 such as, for example, an assigned, predicted, or observed severity score (if any exists, though no such score exists in the illustrated embodiment), an exploit information section, any information from the ZDI, NVD, EDB, and/or other data sources 110. It should be understood that this example is illustrative, and therefore should not be construed as being limiting in any way.

The email 400 or other form of alert 114 can be sent to one or more subscribers and/or subscriber devices such as the subscriber device 116, and the devices or entities can act on the alert 114 to attempt to mitigate any impact from the predicted or observed threat. It can be appreciated that in the illustrated embodiment of the email 400, the NVD, the EDB, and the ZDI have no entries for the predicted or observed threat identified by the threat assessment service 106. Thus, it can be appreciated that the predicted or observed threat can be evaluated and used to prompt an alert 114 before the NVD, EDB, ZDI and/or other data sources 110 have taken such steps (or even added an entry in a respective database) in some embodiments. It should be understood that this example is illustrative, and therefore should not be construed as being limiting in any way.

While the above description has discussed various aspects of observing and/or predicting threats that are predicted or expected to be serious threats, it should be understood that embodiments of the concepts and technologies disclosed herein can also be used to identify serious threats as those vulnerabilities that are most likely to be exploited by one or more actors. Thus, for example, it can be appreciated that threats may be deemed or predicted to be "serious" based on a likelihood of exploitation, and not merely based on the effects or damage possible by the threats. It should be understood that this example is illustrative, and therefore should not be construed as being limiting in any way.

Figure 5:
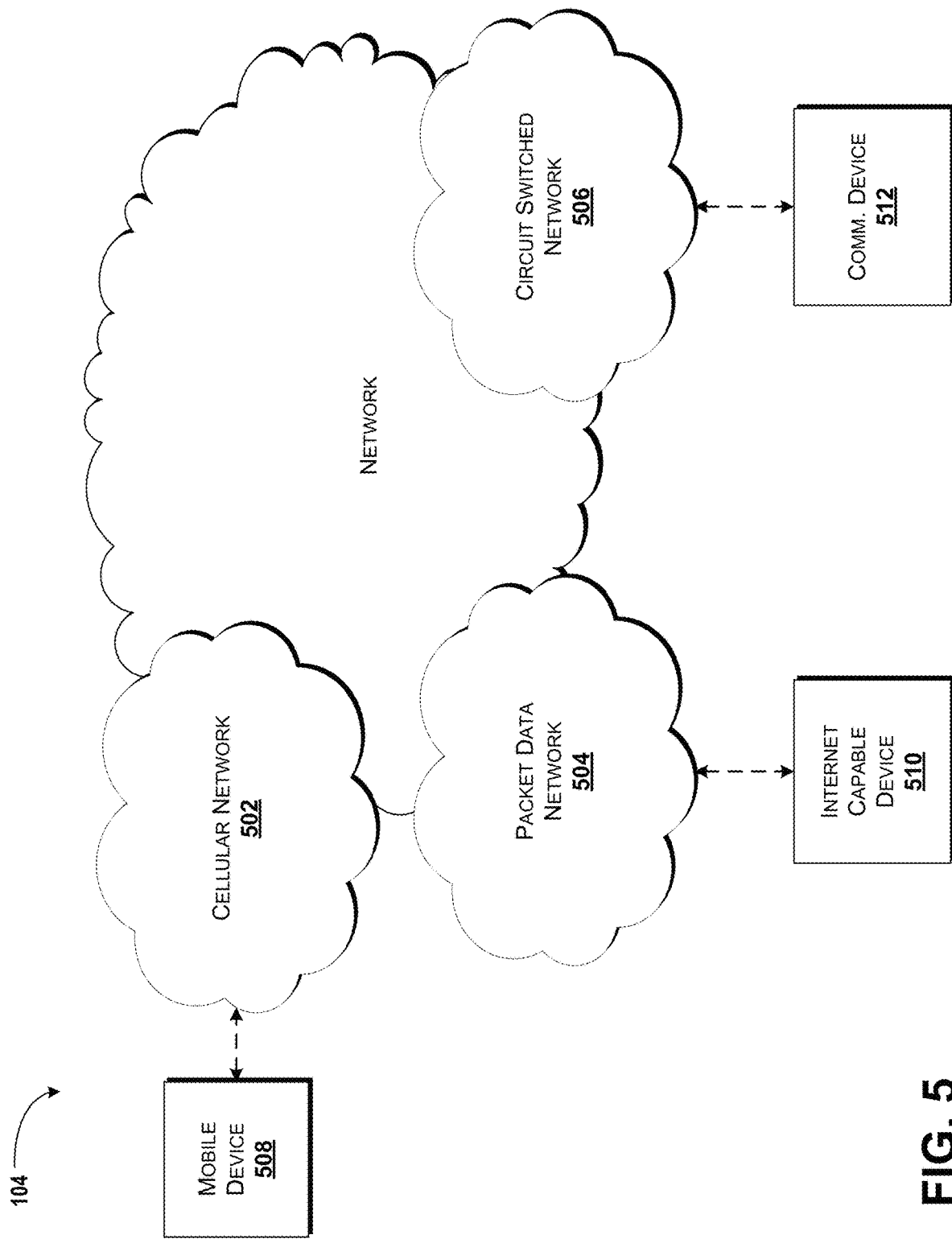
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards, 5G mobile communications standards, other mobile communications standards, and evolved and future mobile communications standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
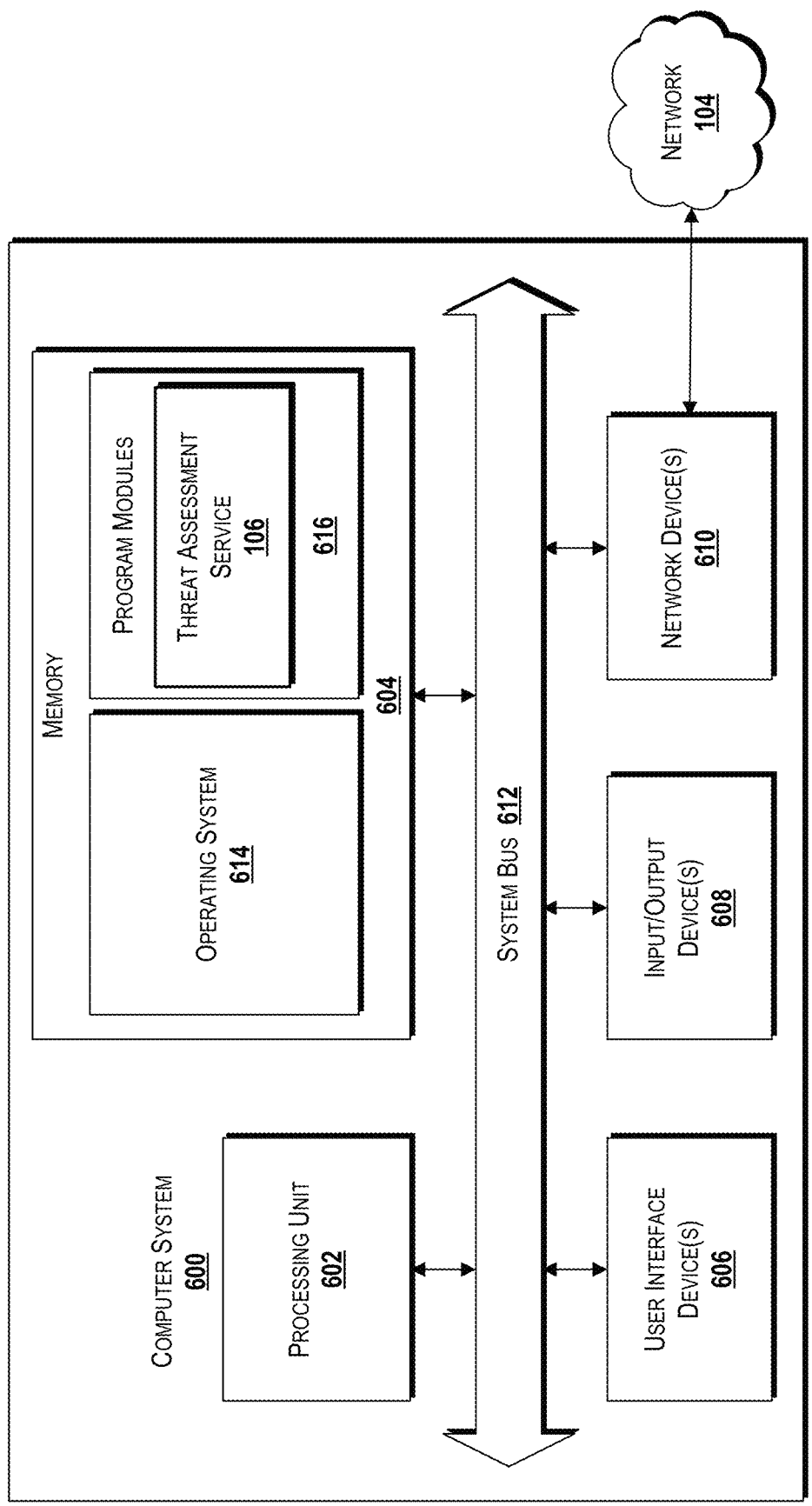
FIG. 6 is a block diagram illustrating an example computer system configured to provide a threat assessment service, according to some illustrative embodiments of the concepts and technologies described herein.

FIG. 6 is a block diagram illustrating a computer system 600 configured to provide the functionality described herein for predicting and using threat levels for cyber threats using data from public data sources, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the threat assessment service 106. This and/or other programs can be embodied in computer-readable media containing instructions that, when executed by the processing unit 602, perform one or more of the methods 200 and 300 described in detail above with respect to FIGS. 2-3 and/or other functionality as illustrated and described herein. It can be appreciated that, at least by virtue of the instructions embodying the methods 200, 300, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the threat data 108, the filtered threat data 112, the alert 114, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as_a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
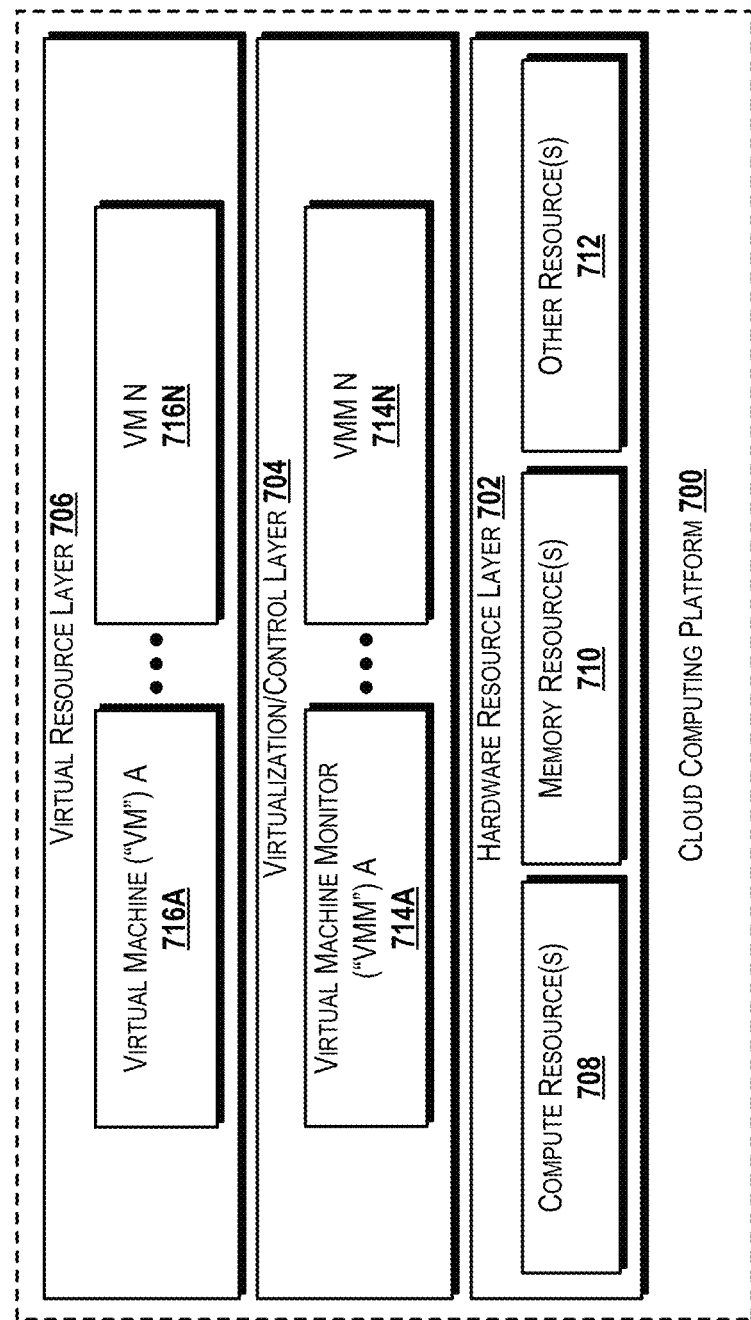
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for predicting and using threat levels for cyber threats using data from public data sources and/or for interacting with the threat assessment service 106. Thus, it can be appreciated that in some embodiments of the concepts and technologies disclosed herein, the cloud computing platform 700 illustrated in FIG. 7 can be used to provide the functionality described herein with respect to the server computer 102, the data sources 110, and/or the subscriber device 116.

The cloud computing platform 700 thus may be utilized to execute any aspects of the software components presented herein. Thus, according to various embodiments of the concepts and technologies disclosed herein, the threat assessment service 106 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the threat assessment service 106 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, California, and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the threat assessment service 106 or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the threat data 108, the filtered threat data 112, the alert 114, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for predicting and using threat levels for cyber threats using data from public data sources have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      obtaining threat data from a plurality of publicly available data sources, wherein the plurality of publicly available data sources comprise a social networking service, and wherein the threat data comprises a plurality of social networking messages,
      determining, based on the threat data, a threat that is predicted to exploit a vulnerability, wherein the threat has a name that identifies the threat,
      storing filtered threat data that is generated by filtering the threat data using the name that identifies the threat, wherein the filtered threat data comprises a further plurality of social networking messages, wherein the further plurality of social networking messages mention the name that identifies the threat,
      analyzing the filtered threat data to determine, based on time and date information included in the further plurality of social networking messages, a mention trend for the threat, a severity score for the threat, an exploitation history for the threat, and a patch availability of the threat,
      determining, based on the mention trend, the severity score, the exploitation history, and the patch availability, a predicted threat level for the threat, wherein the predicted threat level is generated without machine learning and without artificial intelligence that predicts seriousness of the threat based on historical data, and
      in response to determining, based on the predicted threat level, that an alert should be sent to a subscriber device, generating the alert and sending, directed to the subscriber device, the alert.

2. The system of claim 1, wherein filtering the threat data using the name that identifies the threat comprises filtering the plurality of social networking messages for social networking messages that mention the name that identifies the threat.

3. The system of claim 1, wherein determining the mention trend comprises:
   analyzing the further plurality of social networking messages to determine a number of times the threat has been mentioned, a frequency with which the threat has been mentioned, and a rate at which the frequency is changing, wherein mentions of the threat within a defined time period are given more weight than mentions of the threat outside the defined time period; and
   assigning a score to the mention trend, wherein the score is positive if the rate is increasing, and wherein the score is negative if the rate is decreasing.

4. The system of claim 1, wherein determining the exploitation history comprises:
   analyzing the further plurality of social networking messages to determine a number of times exploitations associated with the threat have been mentioned; and
   assigning a score to the exploitation history, wherein the score is a positive integer if the number of times exceeds zero, and wherein the score is zero if the number of times is zero.

5. The system of claim 1, wherein determining the severity score comprises:
   analyzing the further plurality of social networking messages to determine a severity associated with the threat based on the further plurality of social networking messages; and assigning a score to the severity score, wherein the score assigned to the severity score corresponds to a common vulnerability scoring system score that is defined for the threat.

6. The system of claim 1, wherein determining the patch availability comprises:
   analyzing the further plurality of social networking messages to determine a number of patches available for the threat; and
   assigning a score to the patch availability, wherein the score is a negative integer corresponding to the number of patches if the number of patches exceeds zero, and wherein the score is positive one if the number of patches is zero.

7. The system of claim 1, wherein the predicted threat level is determined without a common vulnerability scoring system score, and wherein the predicted threat level is determined before the common vulnerability scoring system score is available.

8. A method comprising:
   obtaining, at a server computer comprising a processor, threat data from a plurality of publicly available data sources, wherein the plurality of publicly available data sources comprise a social networking service, and wherein the threat data comprises a plurality of social networking messages;
   determining, by the processor and based on the threat data, a threat that is predicted to exploit a vulnerability, wherein the threat has a name that identifies the threat;
   storing, by the processor, filtered threat data generated by filtering the threat data using the name that identifies the threat, wherein the filtered threat data comprises a further plurality of social networking messages, wherein the further plurality of social networking messages mention the name that identifies the threat;
   analyzing, by the processor, the filtered threat data to determine, based on time and date information included in the further plurality of social networking messages, a mention trend for the threat, a severity score for the threat, an exploitation history for the threat, and a patch availability of the threat;
   determining, by the processor and based on the mention trend, the severity score, the exploitation history, and the patch availability, a predicted threat level for the threat, wherein the predicted threat level is generated without machine learning and without artificial intelligence that predicts seriousness of the threat based on historical data; and
   in response to determining, based on the predicted threat level, that an alert should be sent to a subscriber device, generating, by the processor, the alert and sending, by the processor and directed to the subscriber device, the alert.

9. The method of claim 8, wherein filtering the threat data using the name that identifies the threat comprises filtering the plurality of social networking messages for social networking messages that mention the name that identifies the threat.

10. The method of claim 8, wherein determining the mention trend comprises:
    analyzing the further plurality of social networking messages to determine a number of times the threat has been mentioned, a frequency with which the threat has been mentioned, and a rate at which the frequency is changing, wherein mentions of the threat within a defined time period are given more weight than mentions of the threat outside the defined time period; and
    assigning a score to the mention trend, wherein the score is positive if the rate is increasing, and wherein the score is negative if the rate is decreasing.

11. The method of claim 8, wherein determining the exploitation history comprises:
    analyzing the further plurality of social networking messages to determine a number of times exploitations associated with the threat have been mentioned; and
    assigning a score to the exploitation history, wherein the score is a positive integer if the number of times exceeds zero, and wherein the score is zero if the number of times is zero.

12. The method of claim 8, wherein determining the severity score comprises:
    analyzing the further plurality of social networking messages to determine a severity associated with the threat based on the further plurality of social networking messages; and
    assigning a score to the severity score, wherein the score assigned to the severity score corresponds to a common vulnerability scoring system score that is defined for the threat.

13. The method of claim 8, wherein determining the patch availability comprises:
    analyzing the further plurality of social networking messages to determine a number of patches available for the threat; and
    assigning a score to the patch availability, wherein the score is a negative integer corresponding to the number of patches if the number of patches exceeds zero, and wherein the score is positive one if the number of patches is zero.

14. The method of claim 8, wherein the predicted threat level is determined without a common vulnerability scoring system score, and wherein the predicted threat level is determined before the common vulnerability scoring system score is available.

15. A computer storage medium having computer-executable instructions stored thereon that, when executed by a processor, cause the processor to perform operations comprising:
    obtaining threat data from a plurality of publicly available data sources, wherein the plurality of publicly available data sources comprise a social networking service, and wherein the threat data comprises a plurality of social networking messages;
    determining, based on the threat data, a threat that is predicted to exploit a vulnerability, wherein the threat has a name that identifies the threat;
    storing filtered threat data that is generated by filtering the threat data using the name that identifies the threat, wherein the filtered threat data comprises a further plurality of social networking messages, wherein the further plurality of social networking messages mention the name that identifies the threat;
    analyzing the filtered threat data to determine, based on time and date information included in the further plurality of social networking messages, a mention trend for the threat, a severity score for the threat, an exploitation history for the threat, and a patch availability of the threat;
    determining, based on the mention trend, the severity score, the exploitation history, and the patch availability, a predicted threat level for the threat, wherein the predicted threat level is generated without machine learning and without artificial intelligence that predicts seriousness of the threat based on historical data; and in response to determining, based on the predicted threat level, that an alert should be sent to a subscriber device, generating the alert and sending, directed to the subscriber device, the alert.

16. The computer storage medium of claim 15, wherein determining the mention trend comprises:
   analyzing the further plurality of social networking messages to determine a number of times the threat has been mentioned, a frequency with which the threat has been mentioned, and a rate at which the frequency is changing, wherein mentions of the threat within a defined time period are given more weight than mentions of the threat outside the defined time period; and
   assigning a score to the mention trend, wherein the score is positive if the rate is increasing, and wherein the score is negative if the rate is decreasing.

17. The computer storage medium of claim 15, wherein determining the exploitation history comprises:
   analyzing the further plurality of social networking messages to determine a number of times exploitations associated with the threat have been mentioned; and
   assigning a score to the exploitation history, wherein the score is a positive integer if the number of times exceeds zero, and wherein the score is zero if the number of times is zero.

18. The computer storage medium of claim 15, wherein determining the severity score comprises:
   analyzing the further plurality of social networking messages to determine a severity associated with the threat based on the further plurality of social networking messages; and
   assigning a score to the severity score, wherein the score assigned to the severity score corresponds to a common vulnerability scoring system score that is defined for the threat.

19. The computer storage medium of claim 15, wherein determining the patch availability comprises:
   analyzing the further plurality of social networking messages to determine a number of patches available for the threat; and
   assigning a score to the patch availability, wherein the score is a negative integer corresponding to the number of patches if the number of patches exceeds zero, and wherein the score is positive one if the number of patches is zero.

20. The computer storage medium of claim 15, wherein the predicted threat level is determined without a common vulnerability scoring system score, and wherein the predicted threat level is determined before the common vulnerability scoring system score is available.

* * * * *